United States Patent [19]
Gregory et al.

[11] Patent Number: 6,132,109
[45] Date of Patent: *Oct. 17, 2000

[54] ARCHITECTURE AND METHODS FOR A HARDWARE DESCRIPTION LANGUAGE SOURCE LEVEL DEBUGGING SYSTEM

[75] Inventors: Brent Gregory; Trinanjan Chatterjee; Jing C. Lin; Srinivas Raghvendra, all of Sunnyvale; Emil Girczyc, Los Altos; Paul Estrada, Mountain View; Andrew Seawright, Cupertino, all of Calif.

[73] Assignee: Synopsys, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/253,470

[22] Filed: Jun. 3, 1994

Related U.S. Application Data

[63] Continuation-in-part of application No. 08/226,147, Apr. 12, 1994, abandoned.

[51] Int. Cl.$^7$ .............................. G06F 9/445; G06F 9/45; G06F 15/00
[52] U.S. Cl. ............................................ 395/704; 364/489
[58] Field of Search .................................... 395/700, 701, 395/704, 705; 364/578, 488, 489, 490, 491

[56] References Cited

U.S. PATENT DOCUMENTS

| | | | |
|---|---|---|---|
| 4,546,435 | 10/1985 | Herbert et al. | 364/300 |
| 4,667,290 | 5/1987 | Goss et al. | 395/707 |
| 4,703,435 | 10/1987 | Darringer et al. | 364/489 |
| 4,827,427 | 5/1989 | Hyduke | 364/489 |
| 4,852,173 | 7/1989 | Bahl et al. | 381/43 |
| 4,866,663 | 9/1989 | Griffin | 395/500 |
| 4,868,770 | 9/1989 | Smith et al. | 364/578 |
| 4,882,690 | 11/1989 | Shinsha et al. | 364/490 |

(List continued on next page.)

OTHER PUBLICATIONS

Weiss, Ray, "ASIC's forcing logic synthesis' hand," Electronic Engineering Times, n516, T16 (pp. 1–2), Dec. 12, 1988.

Weiss, Ray, "Designers moving toward high–level logic representation via logic synthesis—Logic synthesis edging up design hierarchy," Electronic Engineering Times, n526, 81, (pp. 1–10), Feb. 6, 1989.

Weiss, Ray, "Synopsys fine–tunes logic synthesis," Electronic Engineering Times, n534, 138 (pp. 1–3), Apr. 17, 1989.

Brian Ebert et al., "SeeSaw: A Verilog Synthesis Viewer," 2nd Annual International Verilog HDL Conference, Design Excellence for Today and Tomorrow; Santa Clara, CA, Mar. 22–24, 1993, pp. 55–60.

Lis et al., "VHDL Synthesis Using Structured Modeling," 26th ACM/IEEE Design Automation Conference, Jun. 25, 1989, pp. 606–609.

Sougata Mukherjea, et al., "Applying Algorithm Animation Techniques for Program Tracing, Debugging, and Understanding," Proceedings 15th International Conference on Software Engineering, May 17, 1993, Baltimore, MD, pp. 456–465.

Design Analyzer Reference (per paper #9), "Text Viewer," v.3.1, pp. 1–15, Mar. 1994.

(List continued on next page.)

*Primary Examiner*—Tariq R. Hafiz
*Assistant Examiner*—Michael Pender
*Attorney, Agent, or Firm*—Brown Raysman Millstein Felder & Steiner LLP; Jonathan T. Kaplan

[57] ABSTRACT

This invention provides a method for displaying circuit analysis results corresponding to parts of the circuit near the portion of the hardware description language (HDL) specification that generated that part of the circuit. The invention also includes a method for using probe statements in the HDL specification to mark additional points in the initial circuit that should not be eliminated during optimization. This improves the ability to display circuit analysis results near the appropriate part of the HDL specification.

2 Claims, 33 Drawing Sheets

U.S. PATENT DOCUMENTS

| | | | |
|---|---|---|---|
| 4,907,180 | 3/1990 | Smith | 364/578 |
| 4,942,536 | 7/1990 | Watanabe et al. | 364/490 |
| 4,942,615 | 7/1990 | Hirose | 364/578 |
| 4,967,386 | 10/1990 | Maeda et al. | 364/578 |
| 4,970,664 | 11/1990 | Kaiser et al. | 364/521 |
| 5,111,413 | 5/1992 | Lazensky et al. | 364/578 |
| 5,146,583 | 9/1992 | Matsunaka et al. | 395/500 |
| 5,191,541 | 3/1993 | Landman et al. | 364/489 |
| 5,191,646 | 3/1993 | Naito et al. | 395/161 |
| 5,265,254 | 11/1993 | Blasciak et al. | 395/700 |
| 5,282,146 | 1/1994 | Aihara et al. | 364/489 |
| 5,282,148 | 1/1994 | Poirot et al. | 364/491 |
| 5,329,471 | 7/1994 | Swoboda et al. | 364/578 |
| 5,335,191 | 8/1994 | Kundert et al. | 364/578 |
| 5,377,997 | 1/1995 | Wilden et al. | 273/434 |
| 5,437,037 | 7/1995 | Furuichi | 395/700 |
| 5,446,900 | 8/1995 | Kimelman | 395/700 |
| 5,452,239 | 9/1995 | Dai et al. | 364/578 |
| 5,493,507 | 2/1996 | Shinde et al. | 395/500.35 |
| 5,530,841 | 6/1996 | Gregory et al. | 395/500 |
| 5,541,849 | 7/1996 | Rostoker et al. | 364/489 |
| 5,544,066 | 8/1996 | Rostoker et al. | 364/489 |
| 5,544,067 | 8/1996 | Rostoker et al. | 364/489 |
| 5,544,068 | 8/1996 | Takimoto et al. | 364/489 |
| 5,553,002 | 9/1996 | Dangelo et al. | 364/489 |
| 5,555,201 | 9/1996 | Dangelo et al. | 364/489 |
| 5,557,531 | 9/1996 | Rostoker et al. | 364/489 |
| 5,581,738 | 12/1996 | Dambrowski | 395/500.17 |

OTHER PUBLICATIONS

D. E. Thomas et al., "Algorithmic and Register–Transfer Level Synthesis: The System Architect's Workbench," pp. 257–274, publication date unknown.

Pure Software Inc., Pure Coverage Data Sheet (Web Page), copyright 1996.

Pure Software Inc., Quantify Data Sheet (Web Page), copyright 1996.

Pure Software Inc., Purify, Finding Run–Time Memory Errors (Web Page), coyright 1996.

Reed Hastings et al., Pure Software, Inc., Purify, Usenix White Paper on Purify (Web Page), copyright 1996.

Printout of Web Page for Centerline, Code Center, Release 4, Nov. 1994.

HDC Computer Corporation, FirstApps User's Guide, pp. 112–116, copyright 1992.

Louis Trevillyan, "An Overview of Logic Synthesis Systems," 1987, pp. 166–172.

Timothy Kam, "Comparing Layouts with HDL Models: A Formal Verification Technique," 1992, pp. 588–591.

"A Programming the User Interface", Manual of Symbolics, Inc., 4 New England Tech Center, 555 Virginia Road, Concord, MA 01742, title page, pp. iii–v and pp. 1–134, Sep. 1986.

| | TIME | AREA |
|---|---|---|
| entity interrupt_controller is<br>  port(new_request : in bit_vetcor(3 downto 1);<br>    current _level: in bit_vector( 1 downto 0);<br><br>    should_service: out bit);<br>end; | | |
| architecture synthesizable of interrupt_controller is<br><br>  signal new_level: bit_vector(1 downto 0):<br><br>begin | 21 ns | 9 gates |
|   decode: process(new_request)<br>  begin<br>    if(new_request(3) = '1') then<br>      new_level <= "11";<br>    elsif(new_request(2) = '1') then<br>      new_level <= "10";<br>    elsif(new_request(1) = "1") then<br>      new_level <= "01";<br>    else<br>      new_level <= "00";<br>    end if;<br>  end process; | ? | ? |
|   compare:process(current_level, new_level)<br>  begin<br><br>    if(new_level(1) >current_level(1)) then<br>      should_service <= '1';<br>    elsif(new_level(1) <current_level(1)) then<br>      should_service <= '0';<br>    elsif(new_level(0) >current_level(0)) then<br>      should_service <= '1';<br>    else<br>      should_service <= '0';<br>    end if;<br><br>  end process;<br>end; | ? | ? |

Figure 15

```
entity interrupt_controller is
  port(new_request : in bit_vector(3 downto 1);
    current_level: in bit_vector(1 downto 0);

should_service: out bit);
end;

architecture synthesizable of interrupt_controller is signal new_level: bit_vector(1 downto 0);

begin
  --Synopsys block_probe_begin
  decode: process(new_request)
  begin
    if(new_request(3) = '1') then
      new_level <= "11";
    elsif(new_request(2) = '1') then
      new_level <= "10";
    elsif(new_request(1) = '1') then
      new_level <= "01";
    else
      new_level <= "00";
    end if;
  end process:
  --Synopsys block_probe_end compare: process(current_level,new_level)
  begin if(new_level(1) > current_level(1)) then
      should_service <= '1';
    elsif(new_level(1) < current_level(1)) then
      should_service <= '0';
    elsif(new_level(0) > current_level(0)) then
      should_service <= '1';
    else
      should_service <= '0';
    end if;
  end process;
end;
```

Figure 16

| | TIME | AREA |
|---|---|---|
| entity interrupt_controller is<br>  port(new_request : in bit_vector(3 downto 1);<br>    current_level: in bit_vector(1 downto 0);<br><br>    should_service: out bit);<br>end:<br><br>architecture synthesizable of interrupt_controller is<br><br>  signal new_level: bit_vector(1 downto 0);<br><br>begin<br>  --Synopsys block_probe_begin<br>  decode: process(new_request)<br>  begin<br>    if(new_request(3) = '1') then<br>      new_level <= "11";<br>    elsif(new_request(2) = '1') then<br>      new_level <= "10";<br>    elsif(new_request(1) = '1') then<br>      new_level <= "01";<br>    else<br>      new_level <= "00";<br>    end if;<br>  end process:<br>  --Synopsys block_probe_end | 9 ns | 5 gates |
| compare: process(current_level,new_level)<br>begin<br><br>  if(new_level(1) > current_level(1)) then<br>    should_service <= '1';<br>  elsif(new_level(1) < current_level(1)) then<br>    should_service <= '0';<br>  elsif(new_level(0) > current_level(0)) then<br>    should_service <= '1';<br>  else<br>    should_service <= '0';<br>    end if;<br>  end process;<br>end; | 15 ns | 6 gates |

Figure 19

```
entity interrupt_controller is
  port(new_request : in bit_vector(3 downto 1);
    current_level: in bit_vector(1 downto 0);

should_service: out bit);
end;

architecture synthesizable of interrupt_controller is signal new_level: bit_vector(1 downto 0);

begin decode: process(new_request)
  begin
    if(new_request(3) = '1') then
      new_level <= "11";
    eisif(new_request(2) = '1') then
      new_level <= "10";
    eisif(new request(1) = '1') then
      new_level <= "01";
    else
      new_level <= "00";
    end if;
  end process;

compare:process(current_level_new_level)
  begin if(new_level(1) > current_level(1)) then
      should_service <= '1';
    eisif(new_level(1) < current_level(1)) then
      should_service <= '0';
    eisif(new_level(0) > current_level (0)) then
      should_service <= '1';
    else
      should_service <= '0';
    end if;

end process;
end;
```

ARCHITECTURE AND METHODS FOR A HARDWARE DESCRIPTION LANGUAGE SOURCE LEVEL DEBUGGING SYSTEM

RELATED APPLICATION

This application is a continuation-in-part of U.S. application Ser. No. 08/226,147 by Gregory et al, filed on Apr. 12, 1994, now abandoned.

BACKGROUND

1. Field of the Invention

This invention relates to the field of computer aided design for digital circuits, and particularly to debugging digital circuits constructed using logic or behavioral synthesis. This invention also relates to displaying the results of circuit analysis determined in one domain, such as an annotated netlist of gates, in the context of the circuit structure in another domain, such as the hardware description language (HDL) source text.

2. Statement of the Related Art

A digital circuit designer needs to ensure that the circuit performs the correct function subject to many design constraints. For example, the circuit should perform the correct computation in the proper amount of time. The area that the circuit occupies on a semiconductor die should remain within certain bounds. The power that the circuit consumes while operating should also remain within specified bounds. To be economically manufacturable, the circuit should be testable. An economically useful circuit should not take too long to design, manufacture, test or use.

The digital circuit design process involves translating the designer's sometimes ambiguous thoughts about the function and constraints into the tooling necessary to produce a working circuit. For example, producing a full-custom semiconductor chip requires producing masks that define the deposition of chemicals into a substrate as well as producing test patterns that exercise the final product. As another example of tooling, producing a field programmable gate array requires generating the bit pattern to be downloaded into the chip to specify the configuration of the architecture. Computer Aided Design (CAD) tools facilitate the iterative translation of the designer's developing thoughts into the tooling required to produce a working circuit that satisfies the design constraints. The process of iteratively adjusting a design to meet its requirements is called debugging.

The historical model of the digital design process using conventional CAD tools for a semi-conductor chip is as follows. The designer first conceives of a particular function to implement, as well as constraints such as timing or area that the implementation must meet. Next, historically, the designer mentally transforms the desired function into a high level circuit consisting of components such as gates, adders, registers and RAMS. The designer then captures that insight by drawing a schematic of a circuit that implements that function with a schematic capture tool. The schematic shows how more primitive functional elements, such as gates or transistors, connect together to form more sophisticated functions such as arithmetic logic units. In addition, modern schematic capture tools allow the designer to divide the design hierarchically into interconnected pieces, and then allow the user to specify the details of each of the pieces separately. For example, Design Architect by Mentor Graphics of Wilsonville, Oregon provides these schematic capture functions.

Conventional CAD tools, such as those indicated above, can then take the connections in the schematic and other information to evaluate the circuit and to specify the tooling necessary to construct the circuit. Such tools evaluate the circuit in many ways. For example, commercial CAD tools often have a simulator that predicts the response of the circuit to designer specified input patterns. QuickSim II by Mentor Graphics of Wilsonville, Oreg. is a commonly used simulator. Another common CAD tool is a path delay analyzer that identifies the longest timing path in a circuit design. DesignTime by Synopsys, Inc. of Mountain View, Calif. is a tool that provides path delay analysis.

Conventional CAD tools also have the ability to generate the geometric layout of the circuit with layout tools. Cell3 Ensemble by Cadence of San Jose, Calif. is an example of this type of tool. Layout tools are required to produce masks to make a semi-conductor chip.

Conventional CAD tools also have the ability to check that the circuit meets the design rules, and to identify the location of any errors to the designer. Design rules help ensure that the specified circuit will operate once manufactured.

Conventional CAD tools also are used to determine how testable a circuit is, and to generate test patterns automatically. Showing the designer the parts of the circuit that are not testable allows the designer to make modifications that will increase the probability of making a successful chip or circuit. Generating test patterns automatically allows for more thorough testing of the circuit immediately after manufacturing.

As described above, the concept of debugging a circuit design historically refers to the process by which a circuit designer specified a particular implementation with a schematic capture tool, and then used various circuit evaluation tools to verify that the implementation did what the circuit designer wanted. For example, the designer would use a simulator to determine if the circuit produced appropriate outputs from specified inputs. The designer could use the path delay analyzer to determine whether the current design was fast enough to meet the requirements. The layout tools could inform the designer whether the design would fit in the available space.

When a particular design did not meet the designer's expectations or requirements, the designer then modified the design. For example, if the circuit was too slow, the designer identified the offending circuitry and revamped it to increase performance. If the circuit was too large, then the designer revised the circuit to use fewer or smaller components. If the circuit did not behave as required, the designer changed the components and the interconnections to produce the correct function. Because the conventional CAD tools began the analysis with the captured circuit, the timing or area problems could be readily identified to the designer. Because the designer specified the structure of the circuit, the designer could then thoughtfully make adjustments. However, because historically the designer mentally performed the transformation from desired function to circuit, the CAD tools were limited in their ability to identify functional problems to the designer.

Logic synthesis developed to provide the designer with an automatic mechanism to translate a hardware description language (HDL) description of a desired function to a structural description of a circuit that performed the desired function. Logic synthesis begins with the designer describing the desired function using VHDL, Verilog, or any other logic synthesis source language, to specify the behavior. A translator then converts that description into gates and other circuit structures that directly correspond statement by statement with the designer's description. Theoretically, conventional CAD tools could then evaluate the resulting circuit and develop the appropriate tooling.

However, the circuit created by a statement-by-statement translation is generally large and slow. In logic synthesis, translation is followed by logic optimization. Optimization replaces the directly translated structure with a functionally equivalent, yet improved structure.

Unfortunately, the circuit transformations performed by the logic optimizer usually modifies the structure of the circuit. This results in a circuit that is unrecognizable by the designer. The fact that the designer generally can not recognize the original function performed by the transformed circuit makes debugging synthesized logic difficult. Conventional evaluation tools can determine the timing or area problems in the transformed circuit, but the designer can not relate those problems easily to the HDL source specification. Theoretically, the designer could manually determine what part of the HDL specification caused the problem. With that insight, the designer could make the desired changes at the HDL specification, and resynthesize the entire circuit. If the designer's problem occurred in a part of the circuit that passed through the optimizer with few changes, manual backtracking might work. However, the optimization process generally makes many changes, making it either difficult or impossible to backtrack because many points in the original circuit do not exist in the final circuit.

Alternatively, the designer could simply modify the final circuit directly. This would not allow the designer to resynthesize the design from the HDL specification because the designer's circuit changes would be overwritten by subsequent translation and optimization steps. This would destroy the value gained by using the synthesis approach to design.

There are some existing tools and techniques for determining where and how to modify a HDL source specification. One tool allows the designer to examine a gate in the optimized circuit schematic, and inquire where that gate came from in the HDL source, provided that it directly existed in the source. If the tool could not tell where a gate came from, it would say so. An example of a gate tracing tool is Design Analyzer's source-to-gates function, produced by Synopsys, Inc. of Mountain View, Calif. However, many gates are removed and others are added during the translation and optimization process. The gate tracing tool has not proven to be very useful in helping designers debug circuits because many of the components in a optimized circuit can not be traced back to the HDL source specification.

Another method of debugging a synthesized circuit is to partition the design into hierarchical components, and synthesize and optimize the smaller pieces. Because the synthesis and optimization tools generally do not traverse primary inputs and outputs, such a partitioning can reduce the size of the backtracking problem. However, it has the disadvantage that the designer may have to rewrite functionally correct, but nonetheless problematic, synthesis source code to isolate the troublesome parts of the circuit. In addition, this approach will greatly limit the optimizer's ability to reduce the area and increase the speed of the resulting circuits because the optimizer will be constrained by the designer's partition.

In addition, a designer can be mislead by the results obtained by debugging by partitioning. The designer's bug in the circuit might be that it is too slow or too big. Partitioning the synthesis source to locate the cause will result in a different circuit than the unpartitioned source. Therefore, the problem that the designer is chasing could vanish or be made significantly worse by the debugging process itself.

Conventionally, using a synthesizer to translate a specification into a circut can also raise substantial computational problems to incorporate minor changes into a design late in the design process. For example, a designer could have the design fairly close to completion when the designer discovers the need to make a small functional change, such as inverting a particular signal. Intuitively, one would expect that such a small change would require only a small change in the circuit all the way to the layout level. However, it is quite possible that, with conventional synthesis and optimization tools, a small change could require substantial changes in the circuit and the layout. Currently, a designer can limit this kind of problem by partitioning the design into smaller pieces and thus limiting the effect to the directly implicated pieces. However, as described previously, inappropriate or unduly narrow partitioning can limit the ability of the optimization tools to construct a good circuit.

3. A Conventional Design and Debugging Process Overview

FIG. 1 shows an overview of the conventional process for designing and debugging circuits specified with a Hardware Description Language (HDL). The process begins with the designer writing HDL source code 100. A typical language used for specifying circuits is VHDL which is described in the IEEE Standard VHDL Language Reference Manual available from the Institute of Electrical and Electronic Engineers in Piscataway, N.J., which is hereby incorporated by reference. VHDL stands for Very high speed integrated circuit Hardware Description Language. Another language used for specifying circuits is Verilog that is described in Hardware Modeling with Verilog HDL by Eliezer Sternheim, Rajvir Singh, and Yatin Trivedi, published by Automata Publishing Company, Palo Alto, Calif., 1990, which is hereby incorporated by reference. Verilog is also described in the Verilog Hardware Description Language Reference Manual (LRM), version 1.0, November 1991, which is published by Open Verilog International, and is hereby incorporated by reference. The examples used in this document are in VHDL, but the principles readily apply to other circuit specification languages.

After writing a HDL description of a desired function, the designer then simulates the function 101 embedded in the description with a HDL simulator. An example of a functional simulator is VHDL System Simulator that is available from Synopsys, Inc. of Mountain View, Calif. The functional simulator allows the designer to determine whether the circuit produces correct values in response to inputs without regard to timing, area or power constraints. A functional simulator can perform function-only simulation relatively quickly, thus enabling the designer to determine that the circuit will produce the desired output.

If there is a problem with the function, the designer can fix function problems 102 by examining the simulation output and going back to writing HDL code 100. Functional simulation executes the source specification directly without generating or optimizing circuits. Therefore, problems identified during functional simulation can readily be linked to their cause in the HDL source.

If the designer believes that the described circuit provides the correct function, then designer then specifies constraints for the synthesis process 103, e.g. maximum clocking periods, total circuit area, and maximum power. This part of the process is described in Design Compiler Family Reference Manual, Version 3.1a, which is available from Synopsys, Inc. of Mountain View, Calif. and is hereby incorporated by reference. Examples of Computer Aided Design software that use constraint specification are Synergy by Cadence, and Autologic by Mentor Graphics, and Design Compiler by Synopsys.

After developing constraints, the designer then proceeds to synthesize 104 a circuit from the HDL description produced in the writing HDL 100 step. This step involves translating the description into an initial circuit that correspond directly with the statements in the source HDL. An example of software that performs this function is described in the VHDL Compiler Reference Manual, Version 3.1a, which is available from Synopsys, and is hereby incorporated by reference. After translation, the initial circuit is then optimized into a final circuit that meets the performance constraints established in step 103. Prior to optimization, it is a straight-forward task to identify which circuit element of the initial circuit corresponds to what part of the HDL source code. Conventionally, because of the extensive manipulations performed during the optimization process, such identification after optimization becomes almost impossible except at registers and module interface boundaries.

FIG. 2 shows the intermediate data structures involved in the synthesis process 104. The synthesis process begins with HDL source 900. The translator creates a data structure called a parse tree 901 that represents the organizational structure of the HDL. The translator then turns the parse tree into an initial circuit 902. Russ B. Segal's Master's Thesis, "BDSYN: Logic Design Translator" at the University of California at Berkeley, Memo#UCB/ERL M87/33, describes a such a translator, and is hereby incorporated by reference. United States patent application Ser. No. 07/632,439, filed on Dec. 21, 1990, entitled "Method and Apparatus for Synthesizing HDL Descriptions with Conditional Assignments" by Gregory et al, and commonly assigned to Synopsys, Inc. also describes such a translator, and is hereby incorporated by reference. An example of a tool that does this is version 3.1a of the HDL compiler available from Synopsys, Inc.

An optimizer is used to produce the final circuit 903 from the initial circuit 902. The optimization process is explained in "Logic Synthesis Through Local Transformations" by J. Darringer, W. Joyner, L. Berman, and L. Trevillyan in the IBM Journal of Research and Development, volume 25, number 4, July 1981, pages 272–280, which is hereby incorporated by reference. It is also explained in "LSS: A System for Production Logic Synthesis" by J. Darringer, D. Brand, J. Gerbi, W. Joyner, and L. Trevillyan in the IBM Journal of Research and Development, volume 28, number 5, September 1984, pages 537–545, which is hereby incorporated by reference. It is also explained in "MIS: A Multiple-Level Logic Optimization System" by R. Brayton, R. Rudell, A. Sangiovanni-Vincentelli, and A. Wang in the IEEE Transactions on Computer Aided Design, Volume 6, number 6, November 1987, pages 1062–1081, which is hereby incorporated by reference. It is also explained in the Ph.D. dissertation "Logic Synthesis for VLSI Design" by R. Rudell at the University of California at Berkeley in 1989, which is hereby incorporated by reference. The optimization process is also described in the Design Compiler Family Reference Manual, version 3.1a which is available from Synopsys, and is hereby incorporated by reference. An example of software that performs this function is the Design Compiler available from Synopsys, Inc. Other examples of software that performs optimization include Synergy from Cadence, Inc., and AutoLogic by Mentor Graphics.

One approach to optimization is to group one or more initial circuit elements together, and replace those elements with a functionally equivalent collection of elements that has better characteristics than the collection of elements replaced. This results in an intermediate circuit that is functionally equivalent to the original. This intermediate circuit can then some or all of its elements grouped for another replacement. This process is repeated until the optimizer meets the constraints imposed in step 103 of FIG. 1, or is unable to make any further improvement.

Before beginning the optimization process, the components of the initial circuit can be divided into two groups: those components that must be preserved through the optimization process, and those that can be replaced with functional equivalents. For example, a logic optimizer may replace a block of boolean logic with another block so long as function is maintained. Generally, replaceable components can also be eliminated. Examples of components that are generally preserved through the optimization process are primary inputs, primary outputs and registers.

After developing a circuit, the designer can then analyze the circuit 105 using conventional analysis tools, as shown in FIG. 1. For example, the designer could estimate the area that the circuit consumes or what the longest delay path is in the circuit. This analysis can identify problems to the designer. The analysis report 904 is often a text document, as shown in FIG. 2.

After identifying timing, area, testing or power problems with the analysis tools, the designer then devises a means to adjust the circuit to fix these problems 108. Ideally, the designer would go back to the HDL where the function is specified and make adjustments there. However, because it is currently hard to identify the specific places in the source HDL that led to the problem, modifying the appropriate part of the HDL is currently not an effective debugging technique. The designer can usually identify which hierarchical module contains some, of the problem, and the designer could then manually rewrite that module to create more primary inputs and outputs to examine. This is very time consuming and is generally done as a last resort. Alternatively, the designer could adjust the constraints 103 and synthesizes the circuit 104 again to see if the problem is alleviated.

After debugging the circuit, the designer then releases the design for fabrication 106.

4. System Performance

In addition to the debugging problems presented by the transformations made by the logic synthesis process, there are also difficulties associated with efficiently and economically constructing CAD systems that compute and display analysis results. Conceptually, after specifying a design, debugging a circuit involves having the designer repeatedly (1) determine a particular circuit characteristic or property that the designer wants to know about, (2) identify a kind of analysis that will provide information about that characteristic, (3) instruct the CAD system to perform that analysis, (4) display the results of that analysis, and (5) gain insight into the desired characteristic from the display. The designer is interested in completing these steps as quickly as possible. Circuit CAD tools have historically facilitated this goal by making the instruction and display steps computationally efficient. To improve response times, circuit CAD tools have often tightly couple the software that performed the analysis to the software that performed the display function. This was often done by having the display software depend heavily on the data structure used to process or store the results of the analysis.

For example, timing analysis often reveals the portions of the circuit that are too slow. Reviewing this analysis historically has involved examining the schematic and tracing the critical path. However, as described previously, the schematic may have little to do with the designer's specification of the circuit.

This intimate linking of display to analysis causes several problems. First, as described, in conjunction with logic synthesis, displaying the data structure linked with the analysis may not be particularly insightful to the designer. Second, such an intimate linking requires more software development and designer training. If there were N kinds of displays, and M kinds of analysis, and each kind of display could be combined with each kind of analysis, then conventional CAD systems tended to have N*M individual display/analysis programs. This requires the designer to become proficient with a multiplicity of slightly different interfaces as well as requiring the tool supplier to construct all of these tools.

However, modern CAD tools must support the development of chips containing millions of transistors. Designing chips with this many components requires that the CAD tools display and analyze large data structures. Processing large data structures tends to reduce the response time of CAD tools. The conventional technique of tightly coupling the display software to the analysis software helps the CAD system maintain a reasonable response time with the large data structures.

Intimately linking the display tools to the analysis tool data structures poses some problems. First, it tends to require the maker of the CAD tool to produce a large number of products that require support. Second, the variety of such tools tends to introduce variations in the command interface that the designer must use to identify and initiate circuit analysis. Both of these problems lead to frustrated designers and tool builders.

5. Background Conclusion

Using HDL synthesis can simplify the task of circuit design by allowing the designer to specify the required function in an HDL textual description without specifying the details of the circuit implementation. After creating a circuit using synthesis, the designer can use conventional circuit analysis tools to determine characteristics of the final circuit. Conventional analysis will describe such things as the area consumed by different parts of the circuit, or what the longest delay path is through the circuit. Using these analysis results, the designer can then identify which portions of the circuit are problematic. However, because the optimization portion of synthesis often transforms the design substantially, it is difficult, if not impossible, except in certain special cases, to relate specific portions of the final circuit to the HDL source that generated those portions. This inability to trace the circuit analysis results easily to the HDL source represents a substantial barrier for debugging circuits efficiently.

SUMMARY OF THE INVENTION

The present invention provides a method for displaying the results of synthesized circuit analysis visually near the HDL source specification that generated the circuit. Circuit analysis provides information about the characteristics of each portion of the synthesized circuit. The present invention relates the analysis results of each portion of the synthesized circuit to the particular part of the HDL specification that generated that circuit portion. This permits the designer to modify the part of the HDL specification that is responsible for problems identified by circuit analysis. The synthesis process works by translating HDL source code into an initial circuit. Each point in the initial circuit corresponds directly with a particular construct in the HDL source. A final, more efficient circuit is constructed from the initial circuit by logic optimization. Connecting the results of the analysis to the source requires identifying points in the final circuit that be traced directly to the initial circuit. Circuit analysis results corresponding to these invariant points in the circuit can therefore be directly related to the appropriate part of the HDL source, and thus can be displayed near that part.

The present invention provides a method for introducing additional points in the design that remain traceable through the optimization process without requiring reorganization or modification of the HDL source. The present invention provides these additional points, for example, by artificially injecting primary inputs or outputs into the initial circuit, and noting where in the HDL source these points came from.

The present invention provides a method for linking information gleaned from evaluating and analyzing a synthesized circuit to the source code that produced the circuit. The present invention establishes the link by providing a designer with the ability to mark the synthesis source code in the places that the designer wants to be able to debug. The designer marks the source code with a particular text phrase, such as "probe", along with some additional optional information. During translation, the translator generates a circuit the provides the same function as it did without the "probe" statement, but adds additional information or components to the initial circuit that indicate that certain components should not be replaced during optimization. Because those components will not be replaced during optimization, the circuit analysis results corresponding to any unreplaced components that are in the final circuit will be directly and traceably related to those components in the initial circuit. Because those components are traceably related to the source HDL, the results are traceably related to the source HDL, and therefore be displayed near the appropriate portion of the HDL. Allowing for the interjection of unreplaced components by the designer facilitates debugging without rewriting the designer's original hierarchical design or manually backtracking through the optimization process.

In another aspect of the invention, the designer can assign a priority level to each probe to help manage the debugging process. These priority levels could then be used to activate or deactivate selected probes as a group. An activated probe would establish a link through the synthesis process to facilitate debugging. An inactive probe would have no effect on the synthesis process, and would not establish a debugging link. Establishing many links would provide the designer with a large degree of debugging information, but could limit the ability of the synthesis process to provide a good circuit. Establishing too few links may not provide enough guidance to the designer to resolve circuit problems. By selectively activating groups of probes at different times during the debugging process, the designer can analyze different portions of the design without the probes themselves unduly interfering in the process.

By providing a facility for displaying the results of circuit analysis near the HDL that created the circuit, the present invention allows a designer to make more effective use of logic synthesis and reduce the complexity of the circuit debugging process.

An aspect of the present invention provides a method and system for processing requests from designers about the characteristics associated with the logic synthesis source specifying a circuit, and displaying the results of circuit analysis with a consistent set of display tools that are not intimately tied to the data structure used for the circuit analysis. The present invention achieves this by first observing that the representation of the circuit can be divided into domains characterized by the structure of the information used to represent the design. Then the tool builder can develop domain dependent display tools for examining the state of the design in that domain. In addition, the tool builder can also develop tools that evaluate or analyze the state of the circuit in a particular domain. Display tools showing the circuit structure in one domain can obtain information related to analysis obtained in another domain by the forward and backward linkages provided by this invention.

The designer can inquire about the characteristics related to a specific part of the design by first examining part of the design in one domain with a display tool. This domain is the inquiry domain. After identifying a relevant portion of the design in the inquiry domain, the designer selects a constituent piece of the design to evaluate, and makes an inquiry about that piece. This information constitutes a query. The display tool forwards the identification of the object in the inquiry domain and an identifier indicating the requested analysis or evaluation to the database. The database then determines the domain that would contain the relevant analysis results. If those results do not yet exist, the database invokes the appropriate analysis tool to put those results into the database. Using the linkage established with the HDL-debugging method, the database locates the related object in the analysis domain. From the related object, the appropriate information is passed back to the display tool where the designer can see it displayed appropriately.

One aspect of the present invention provides display tools that are not dependent on the structure of the domain in which the analysis is actually performed. Another aspect of the invention provides analysis tools that are not dependent on the structure of the display domain. Another aspect of the invention is to allow the different display and analysis tools to remain independent from one another.

BRIEF DESCRIPTION OF THE DRAWINGS

FIG. 15. An example of a display relating data found from analysis of the optimized circuit of FIG. 10 to the source VHDL showing that information can only be related to the highest level in the description.

FIG. 16. VHDL source with two block probes installed.

FIG. 19. An example of a display relating data found from analysis of the optimized circuit of FIG. 18 to the source VHDL showing information related to the block probes.

FIG. 23. Display of the primary inputs reached from transitive fan-in trace of a particular signal in the source HDL in accordance with the present invention.

FIG. 31 shows a virtual schematic display showing the inputs and outputs associated with a particular part of VHDL source code.

FIG. 32 shows another virtual schematic display tracing the output of the display in FIG. 31.

FIG. 33 shows another virtual schematic display tracing the output of the display in FIG. 32.

DETAILED DESCRIPTION OF THE INVENTION

The present invention comprises a novel method for the using the links and establishing new links between an HDL source description of a circuit and the analysis results of the translated and optimized actual circuit that arises from the source description. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Improved Design and Debugging Process

Figure 3:
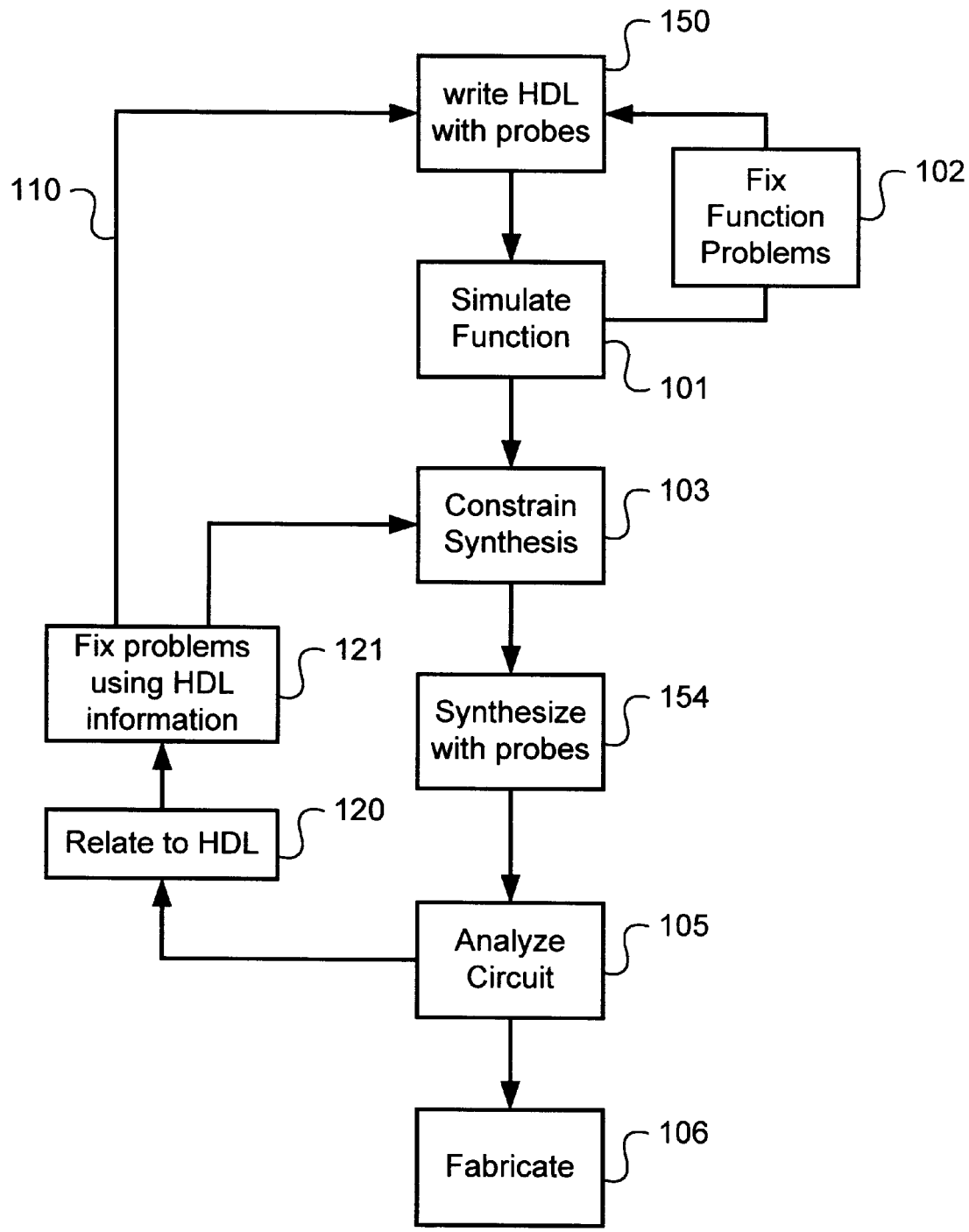
FIG. 3. A flow diagram showing an earlier synthesis-analysis process.

FIG. 3 shows the general design and debugging process in accordance with the present invention. The designer writes HDL with probe statements 150. The probe statements identify the places in the resulting circuit that the designer will wish to examine. The designer may not initially know where probes will be required until later in the design process. The probes have no impact on functionality so functional simulation 101 and functional repair 102 proceed as before. The designer also constrains synthesis 103 as before.

Synthesizing with probes 154 differs from conventional synthesis 104. When the translator encounters a probe statement, the translator interjects information into the netlist to indicate to the optimizer that optimization should not proceed "past" or "through" that particular point. The optimizer then produces a new circuit subject to these constraints. In one embodiment, the probed portions of the HDL source are treated as both primary inputs and primary outputs during translation and optimization.

The circuit analysis step 105 proceeds as before. After analysis, the tool then uses information developed during translation to relate the results of the analysis to the HDL source as indicated by step 120.

With the information gleaned from the probes, the designer can now identify problems and evaluate solutions that directly change the HDL, as shown in step 121.

After completely analyzing and debugging the design, the actual circuit can be fabricated as it was before as shown in step 106.

As described above, optimizers divide an initial circuit's components into two groups: components that can be replaced and those that can't. One method of implementing probes would be to mark the components of the initial circuit attributable to the probed part of the HDL as components that can not be replaced during optimization. For example, the translator could create a primary input and a primary output at the places in the initial circuit corresponding to the probed part of the HDL source.

After optimization, the circuit can then be analyzed with conventional circuit analysis tools to provide an analysis report 904. For example, the analysis report can indicate the time it takes for a signal to reach various points in the optimized circuit. Analysis could also reveal what portions of the design are not testable or occupy a large amount of area. Because each report provides information linked to the nodes of the optimized circuit, each report therefore provides information about each node that did not change during the optimizer's iterations. Each node that did not change during the optimization process can be traced to a particular place in the HDL source using the information developed in constructing the parse tree.

Examples of Using and Processing Probes

FIG. 4 through FIG. 18 illustrate by example how probes work and how the debugging information could be displayed to the user. The examples use VHDL as the source language. The principles illustrated do not depend on the particular language.

Figure 4:
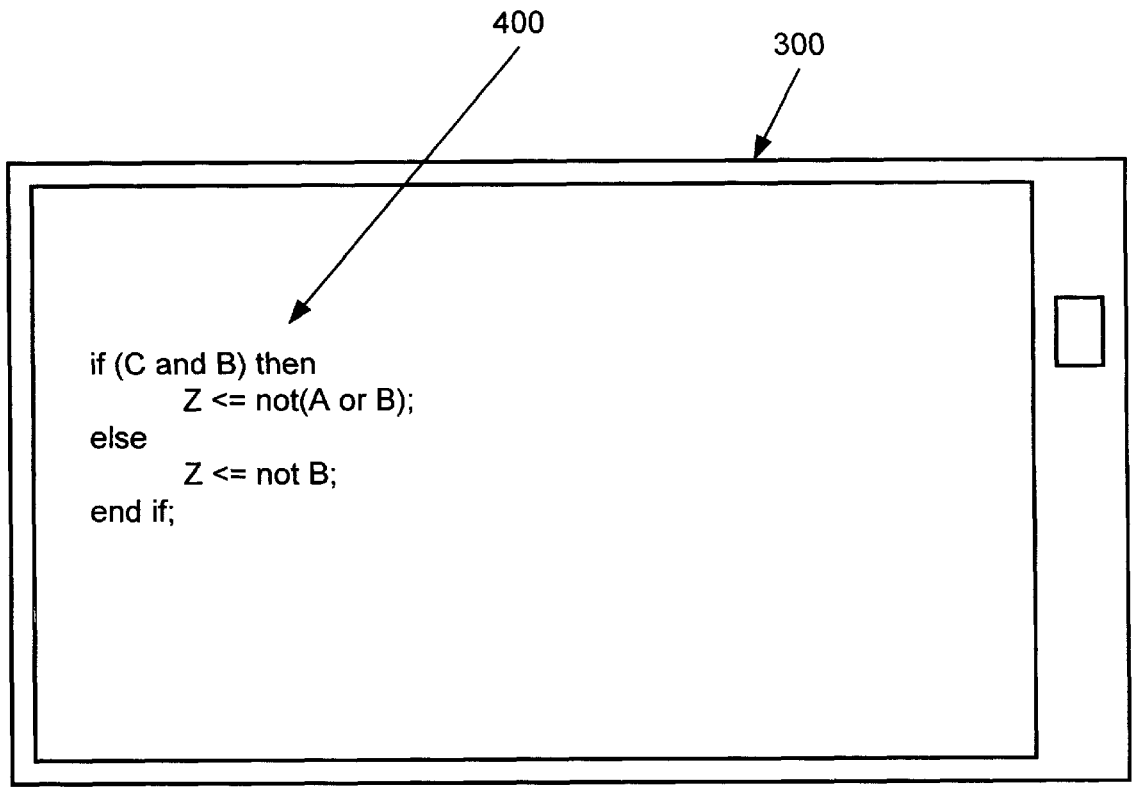
FIG. 4. An example of VHDL source with no probes.

FIG. 4 shows a text editor window 300 containing a VHDL code fragment 400 that does not contain any probe statements. The code fragment shown in FIG. 4 is repeated below:

```
if (C and B) then
    Z <= not(A or B);
else
    Z <= not(B);
end if;
```

Figure 5:
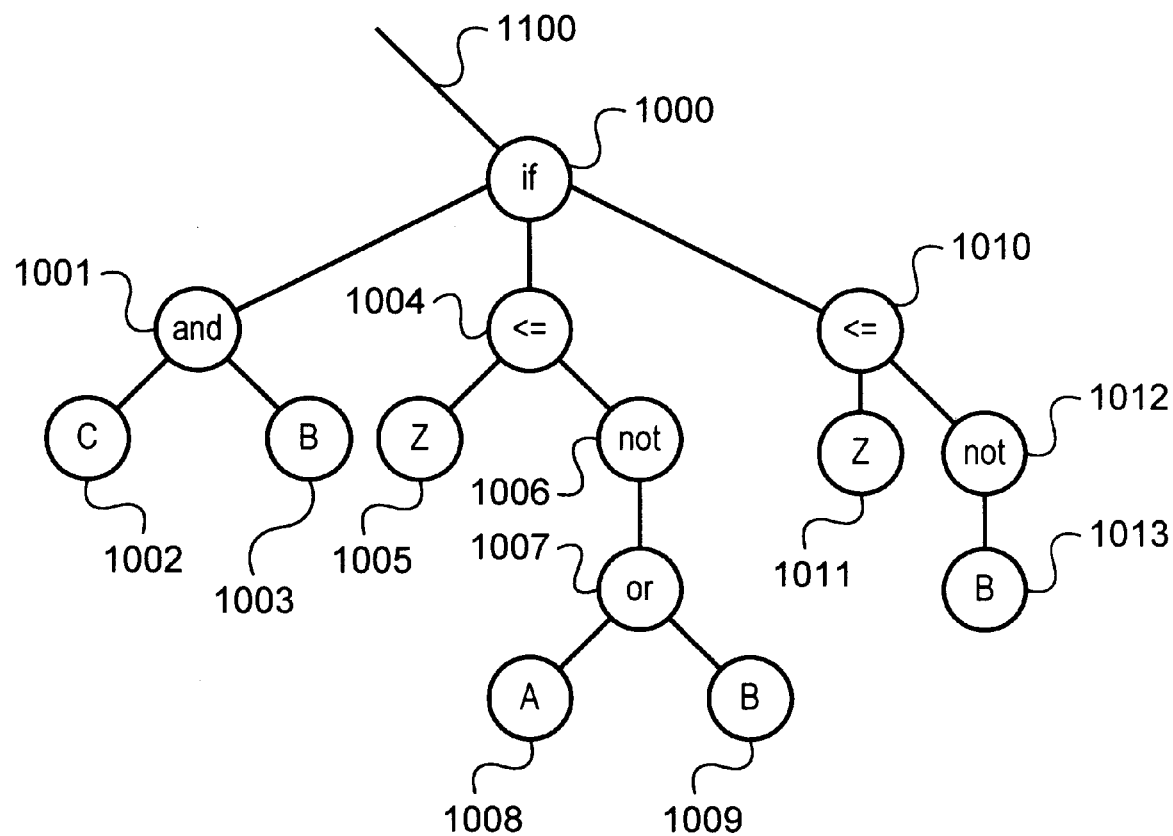
FIG. 5. A parse tree corresponding to the source fragment in FIG. 4.

FIG. 5 shows a graphical representation of the parse tree constructed while translating the source code in FIG. 4. Link 1100 is the connection that this fragment has with the rest of the VHDL description. The "if" statement in VHDL has three parts: a condition; a VHDL statement to process when the condition is true; and a VHDL statement to process when the condition is false. The condition is dealt with in the tree descending from node 1001. The true condition is handled by the tree descending from node 1004. The false condition is handled by the tree descending from node 1010. The assignments represented by nodes 1004 and 1010 are used to link the signal values represented by node 1005 and node 1011 to their functions represented in the trees descending from nodes 1006 and 1012 respectively.

Figure 6:
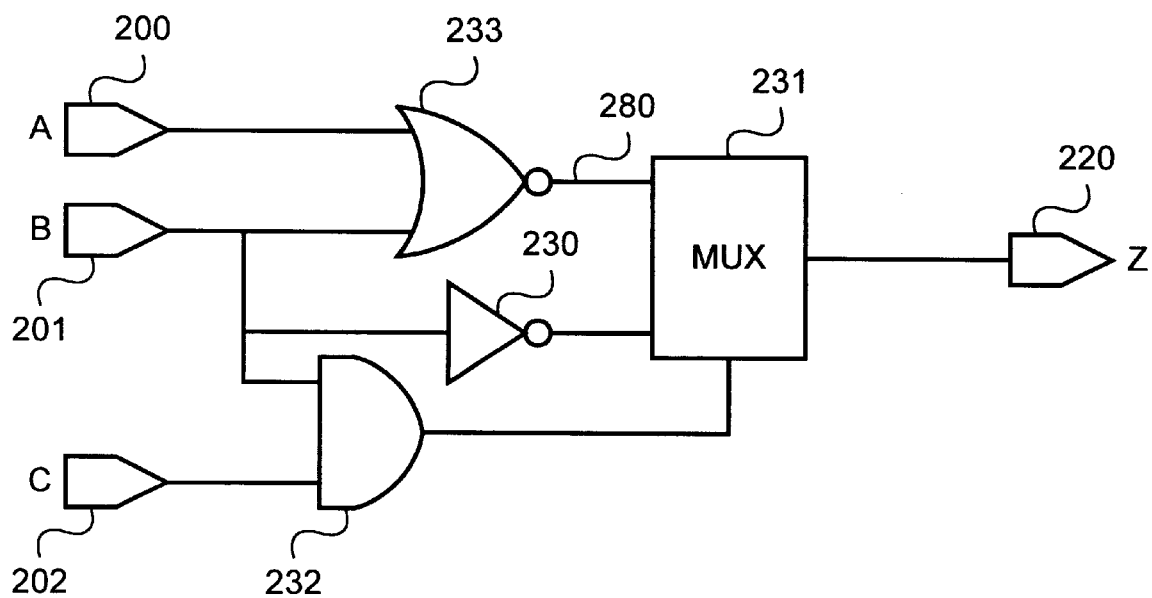
FIG. 6. A circuit arising from the conventional translation of the source fragment in FIG. 4.

Without a probe statement, the VHDL fragment would translate into the circuit of FIG. 6. Inputs A, B, and C are schematically represented by the connectors 200, 201, and 202. The "if" statement would translate into multiplexor 231. The condition "(C and B)" would translate into and gate 232. The "true" condition would translate into nor gate 233 while the "false" condition would translate into invertor 230.

Figure 7:
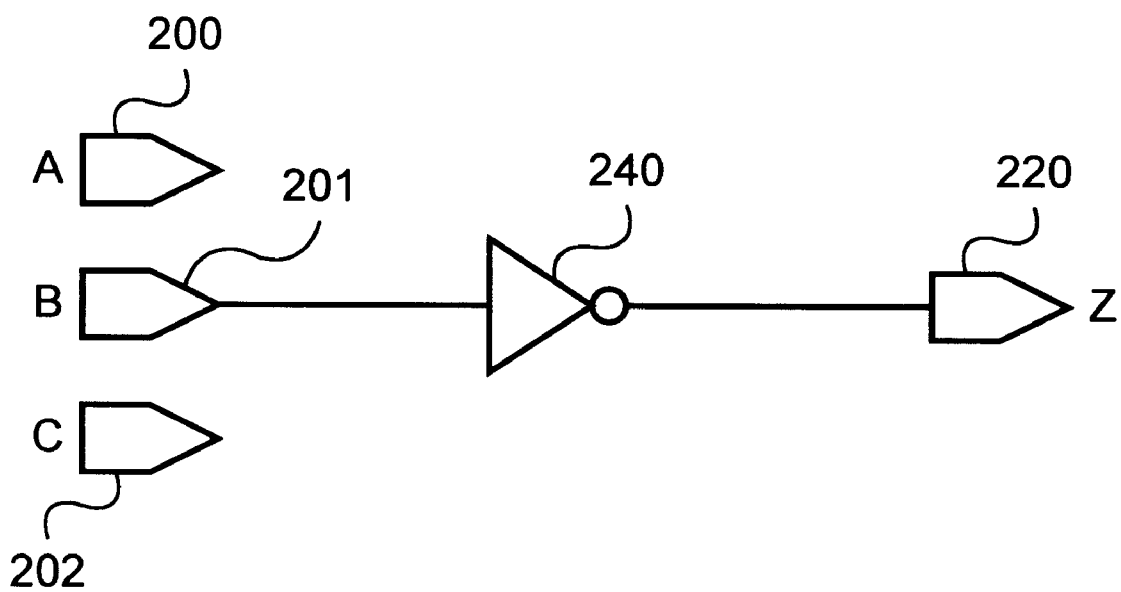
FIG. 7. An optimized version of the circuit of FIG. 6.

FIG. 7 shows a circuit optimized from the digital circuit of FIG. 6. In particular, the logic function that this code fragment really performs is not(B). At this point, without probes in the conventional synthesis design process, the designer can not obtain much information about the internal timing information descending from the fragment. For example, if the designer needed to know when the value of not(A or B) was computed to help analyze some other aspect of the design, then the designer would not be able to deduce that information from the resulting analysis.

Figure 8:
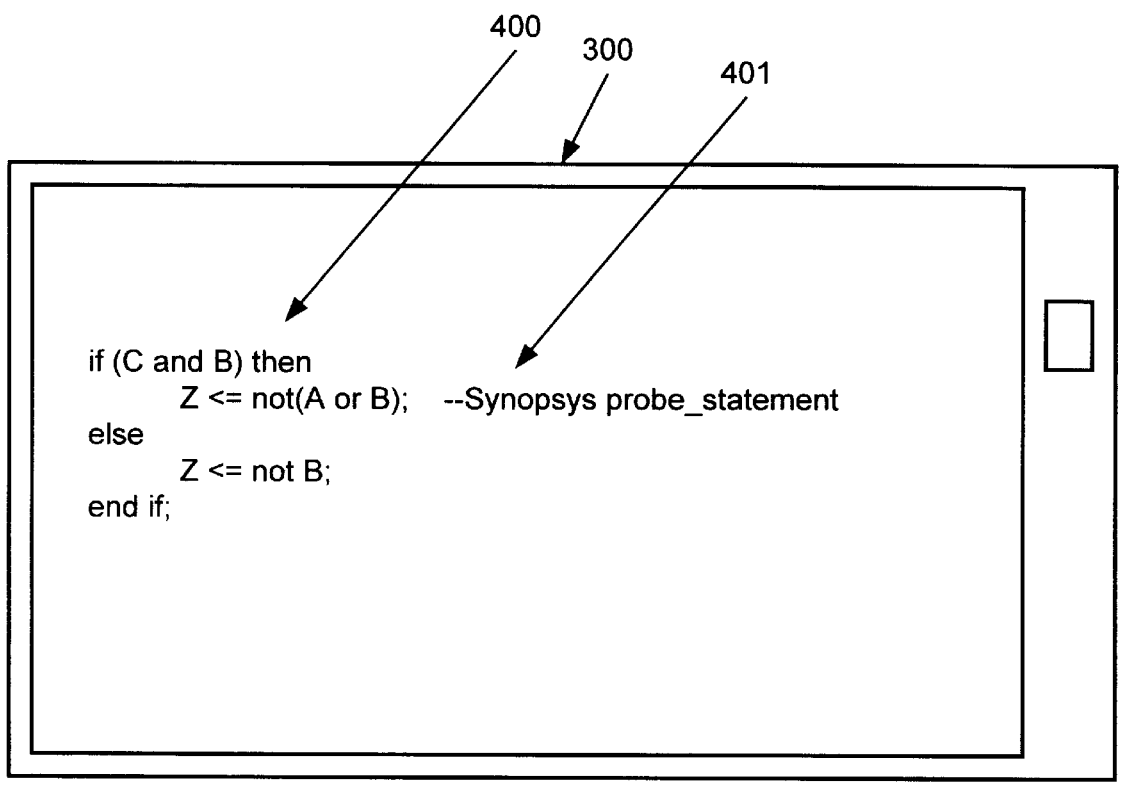
FIG. 8. The VHDL source in FIG. 4 with statement probes inserted.

FIG. 8 shows how a probe statement 401 could be inserted into the source description. The code fragment is repeated below:

```
if (C and B) then
    Z <= not(A or B); --Synopsys probe_statement
else
    Z <= not(B);
end if;
```

In VHDL, "--" begins a comment. The word "Synopsys" immediately after the "--" indicates that this is not an ordinary comment, but rather a directive to the translator or other part of the computer aided design tool environment. The word "probe_statement" indicates that this particular VHDL statement should be processed so that it will be possible to relate analysis information to this point in the circuit.

Figure 9:
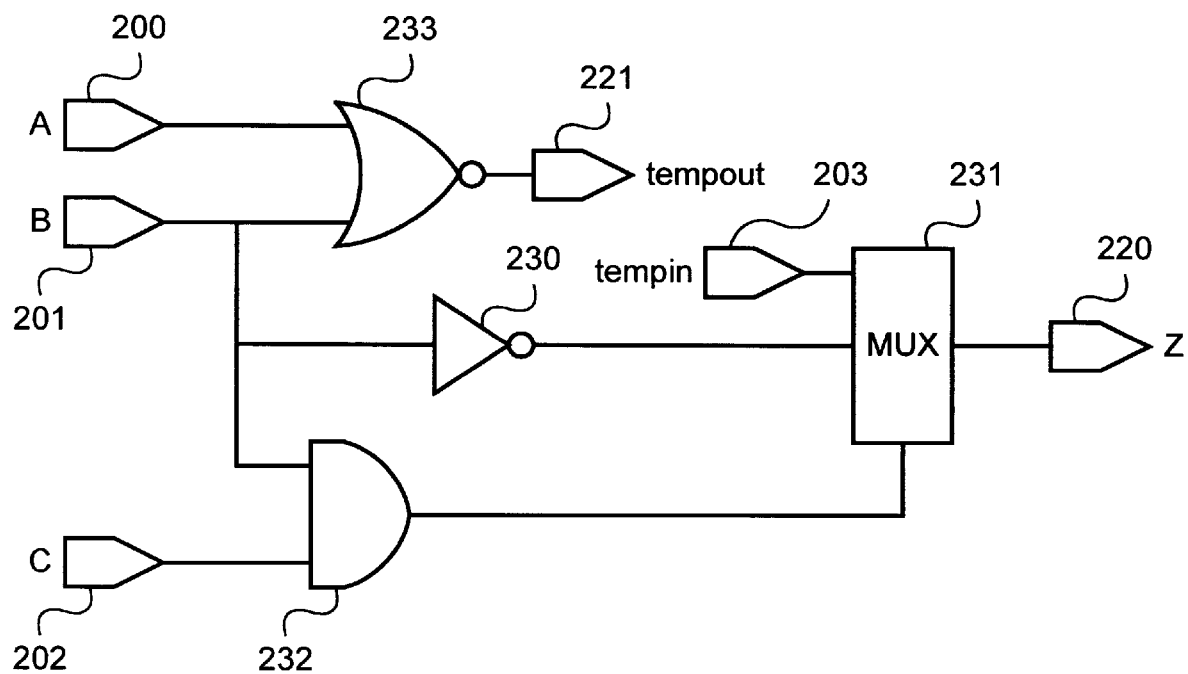
FIG. 9. Translation of the source in FIG. 8.

FIG. 9 shows a circuit that a translator could produce from the code fragment shown in FIG. 8 with the probe statement. The parse tree produced with the probe statement is the same as before, namely the tree of FIG. 5. However, the probe statement will cause the signal represented by node 1005 to behave as both a primary output and a primary input.

In creating the circuit of FIG. 9 from the parse tree, the translator could add temporary input 203 and a new temporary output 221. In addition to synthesizing this circuit, the translator connects the new temporary input to the new output at a higher level in the net list produced from translating the whole specification.

Figure 10:
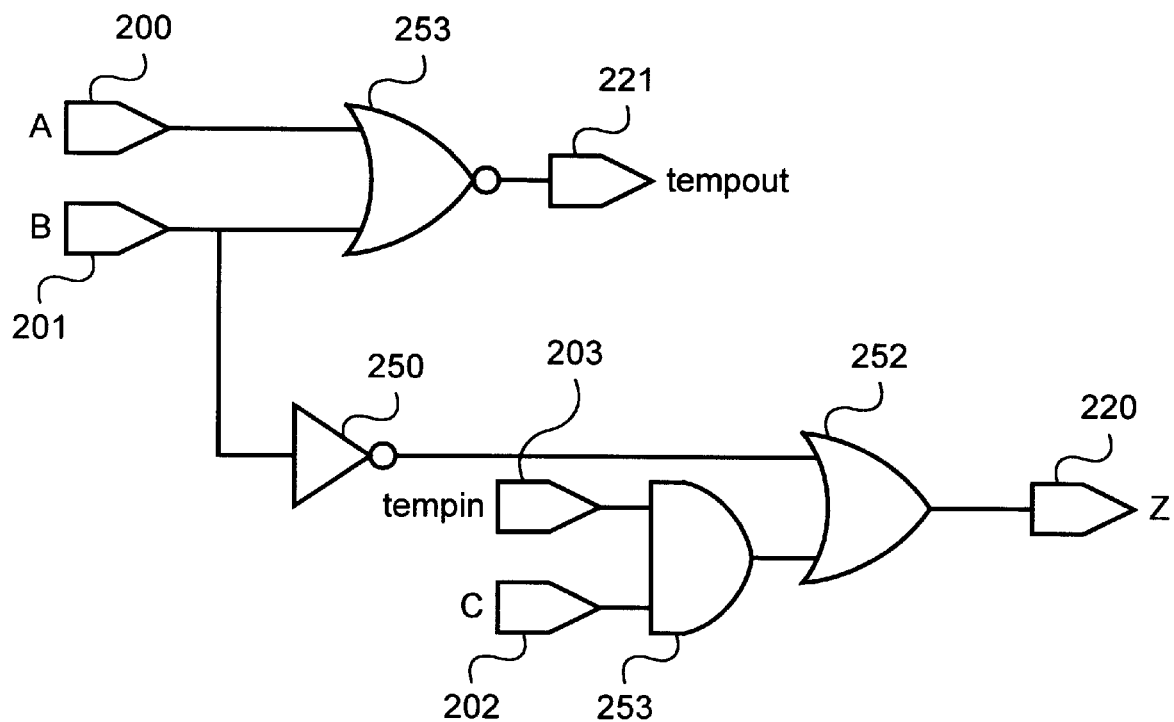
FIG. 10. An optimized circuit derived from the circuit of FIG. 9.

FIG. 10 shows the circuit of FIG. 9 after optimization. The optimizer is not permitted to optimize circuits past the boundaries established by the probe statement. This means that nor gate 233 of FIG. 9 would be transformed into nor gate 253 of the optimized circuit. The nor gates are not necessarily identical because additional details may be specified about the gates during the design compilation process. Those details are not relevant to the implementation of probes.

Figure 11:
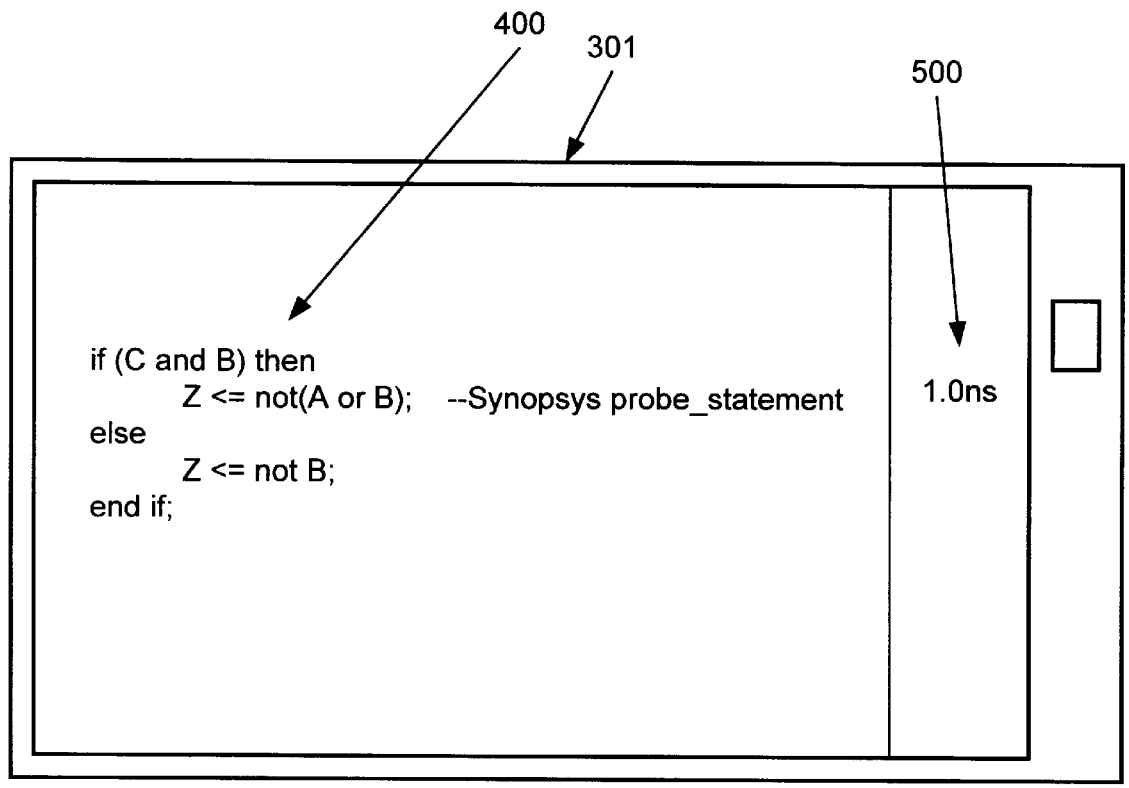
FIG. 11. An example of a display relating information found from analysis of the optimized circuit of FIG. 10 to the source HDL.

Because the logic optimization process left temporary input 203 and temporary output 221 alone, and those points correspond to a particular point in the HDL circuit, any analytic result related to temporary input 203 or temporary output 221 can be identified with the probe statement 401 in the HDL. FIG. 11 shows how timing information could be related back to the HDL in a special text window 301. For example, suppose a critical path analysis tool determined that it took 1.0 nanoseconds to produce temporary output 221 of FIG. 10 after a clock edge arrived at a flip-flop somewhere else in the circuit. By using the fact that temporary output 221 came from this line of the source, the timing result 500 can be displayed next to the appropriate line of the output.

Figure 12:
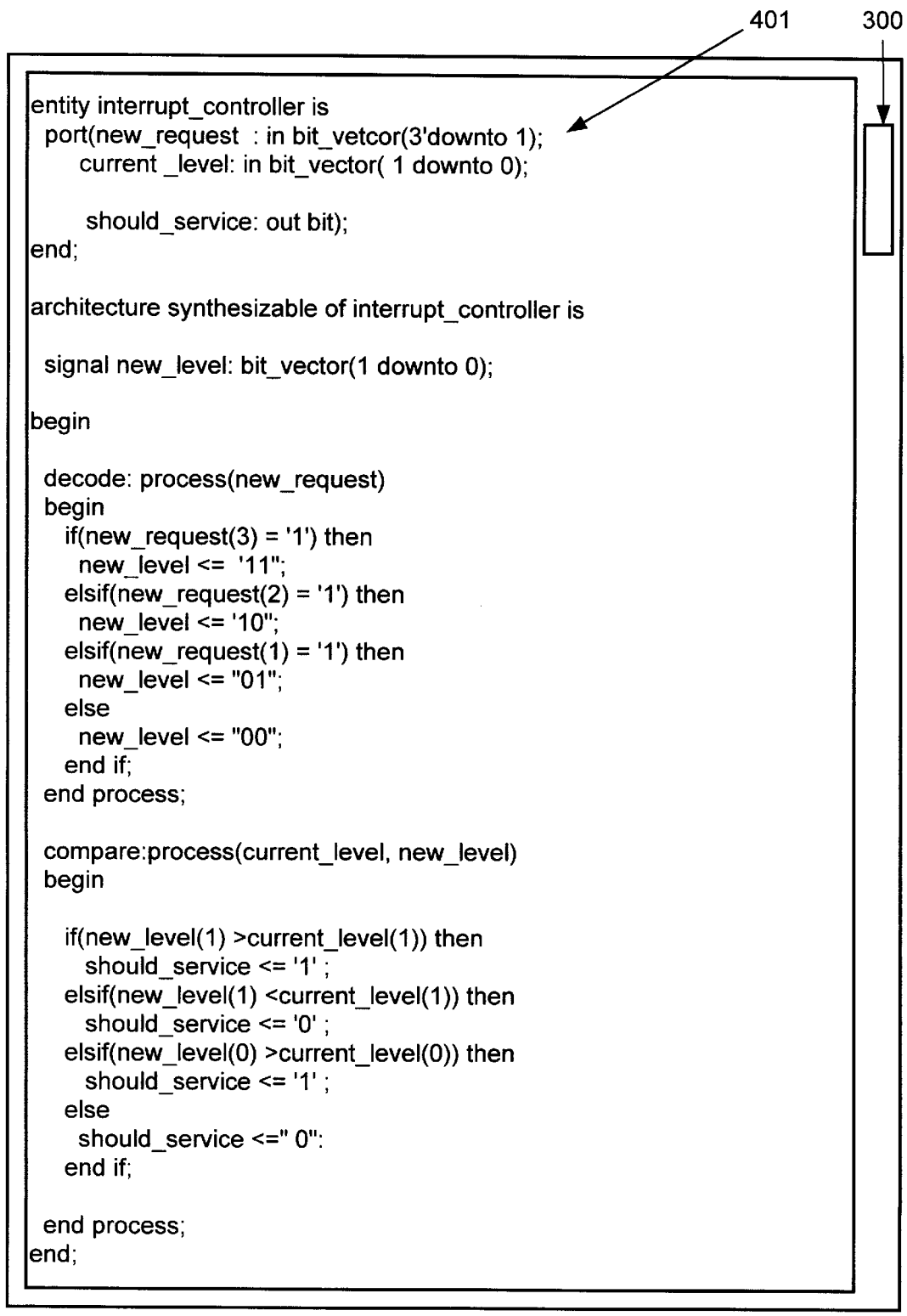
FIG. 12. VHDL source without probes using two process blocks.

FIG. 12 through FIG. 19 show another way to use probes to evaluate the performance of blocks of HDL code. FIG. 12 shows a text window with an HDL entity described. This text has no probe statements inserted, and the code is repeated below.

```
entity interrupt_controller is
    port(new_request : in bit_vector(3 downto 1);
            current_level: in bit_vector(1 downto 0);
            should_service: out bit);
end;
architecture synthesizable of interrupt_controller is
    signal new_level: bit_vector(1 downto 0);
begin
    decode: process(new_request)
    begin
        if(new_request(3) = '1') then
            new_level <= "11";
        elsif(new_request(2) = '1') then
            new_level <= "10";
        elsif(new_request(1) = '1') then
            new_level <= "01";
        else
            new_level <= "00";
        end if;
    end process;
    compare: process(current_level, new_level)
    begin
        if(new_level(1) > current_level(i)) then
            should_service <= '1';
        elsif(new_level(1) < current_level(1)) then
            should_service <= '0';
        elsif(new_level(0) > current_level(_)) then
            should_service <= '1';
        else
            should_service <= '0';
        end if;
    end process;
end;
```

This VHDL source code computes whether a new interrupt should be serviced. It determines what the new level of the interrupt is by determining what input line is asserted, and comparing the interrupt priority level associated with that with the level of the currently pending interrupt. If the new level is higher, then the output should_service is set high, and otherwise it is set low.

Figure 13:
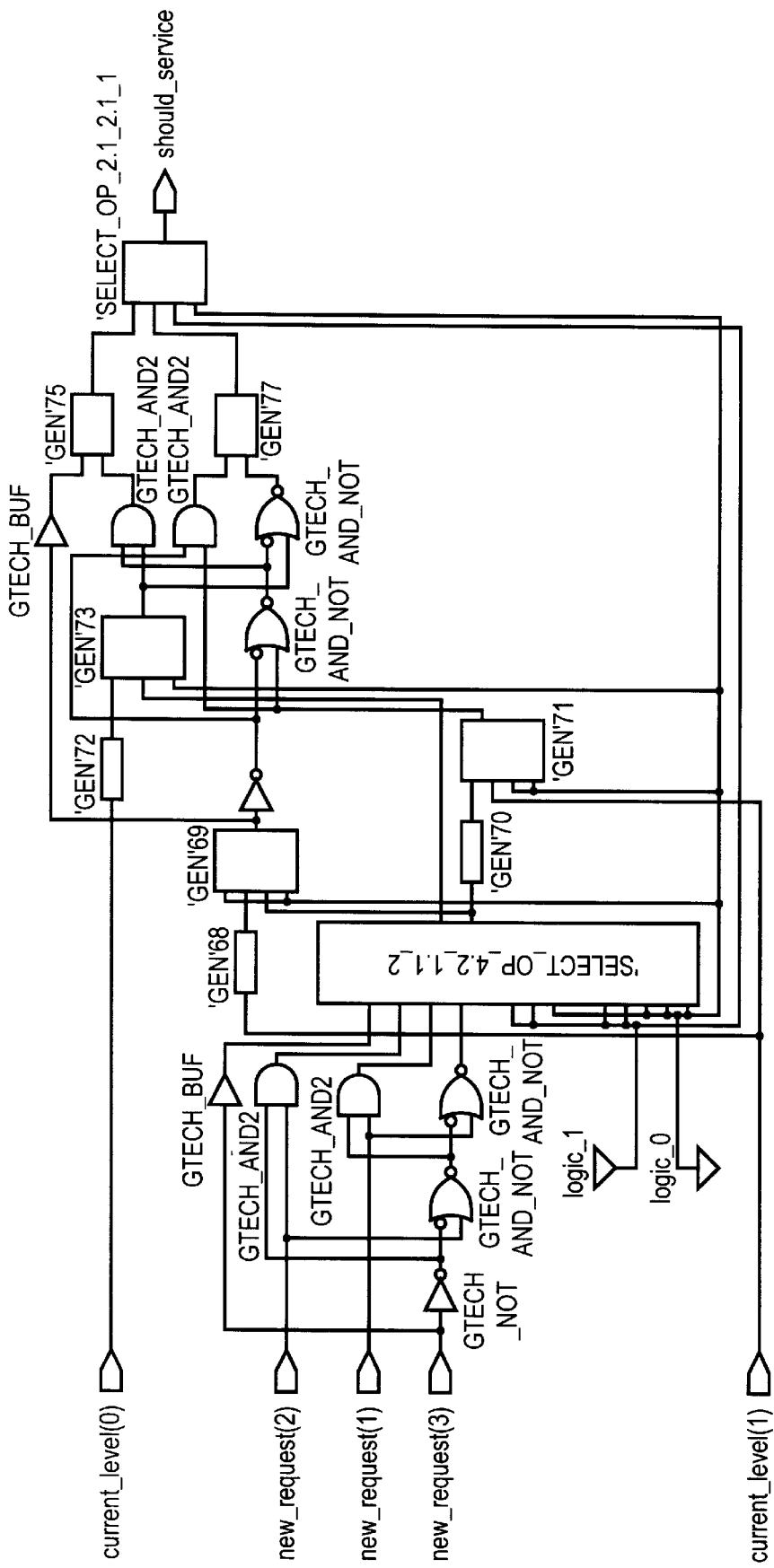
FIG. 13. Conventional translation of the source in FIG. 12 into a circuit.
Figure 14:
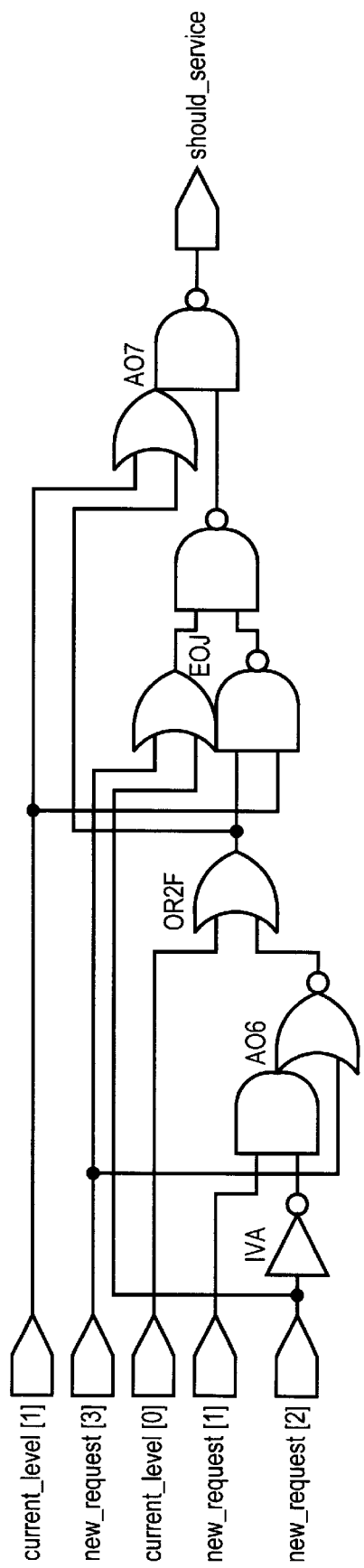
FIG. 14. An optimized circuit derived from the circuit of FIG. 13.

FIG. 13 shows the circuit resulting from translating the VHDL source. FIG. 14 shows the circuit that results from optimizing the circuit in FIG. 13.

FIG. 15 shows a special text window that summarizes some of the performance information about the circuit. The analysis tool can provide information about the design as viewed from the inputs. An analysis tool could provide an estimate of the area of the design by counting gates or compute the longest delay through the entire design. The designer might conclude that this circuit is too big or too slow. Because all of the inner details of the design have been optimized, it is not realistic for the designer to examine the schematic in FIG. 14 manually and determine whether the decoding function or the comparing function is too big or too slow.

To determine where the problems lie, the designer could insert block probes textually near the definition of the decoding and comparing processes, as shown in the text window of FIG. 16. This would probe all signals entering or leaving the sequence of HDL code delineated by the begin block and end block statements. When translated, the probed HDL would become the circuit of FIG. 17. The translator would create temporary inputs 2010 and 2011, and temporary outputs 2000 and 2001, much as it did with the statement probe.

Figure 17:
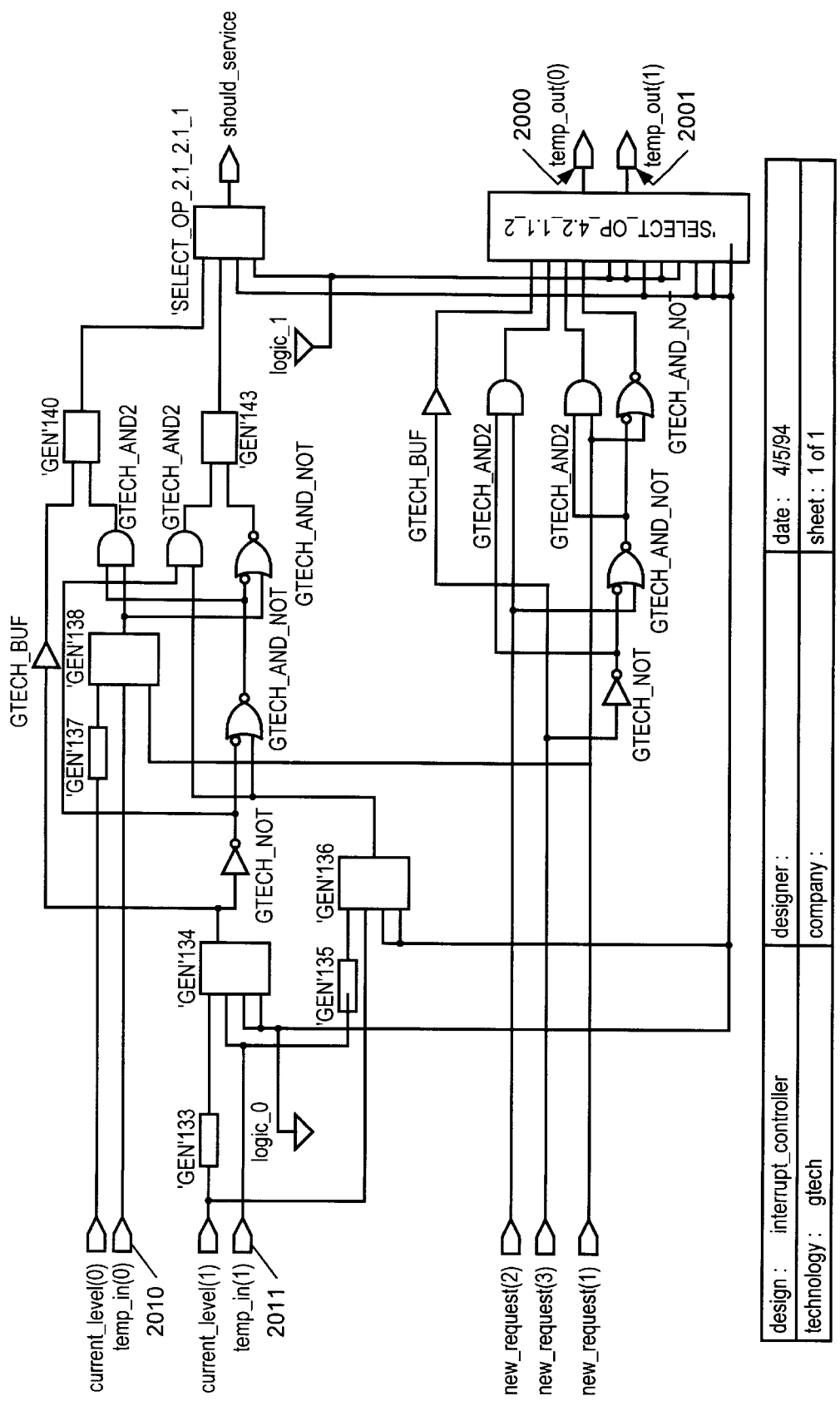
FIG. 17. A circuit generated by translating the VHDL source of FIG. 16.
Figure 18:
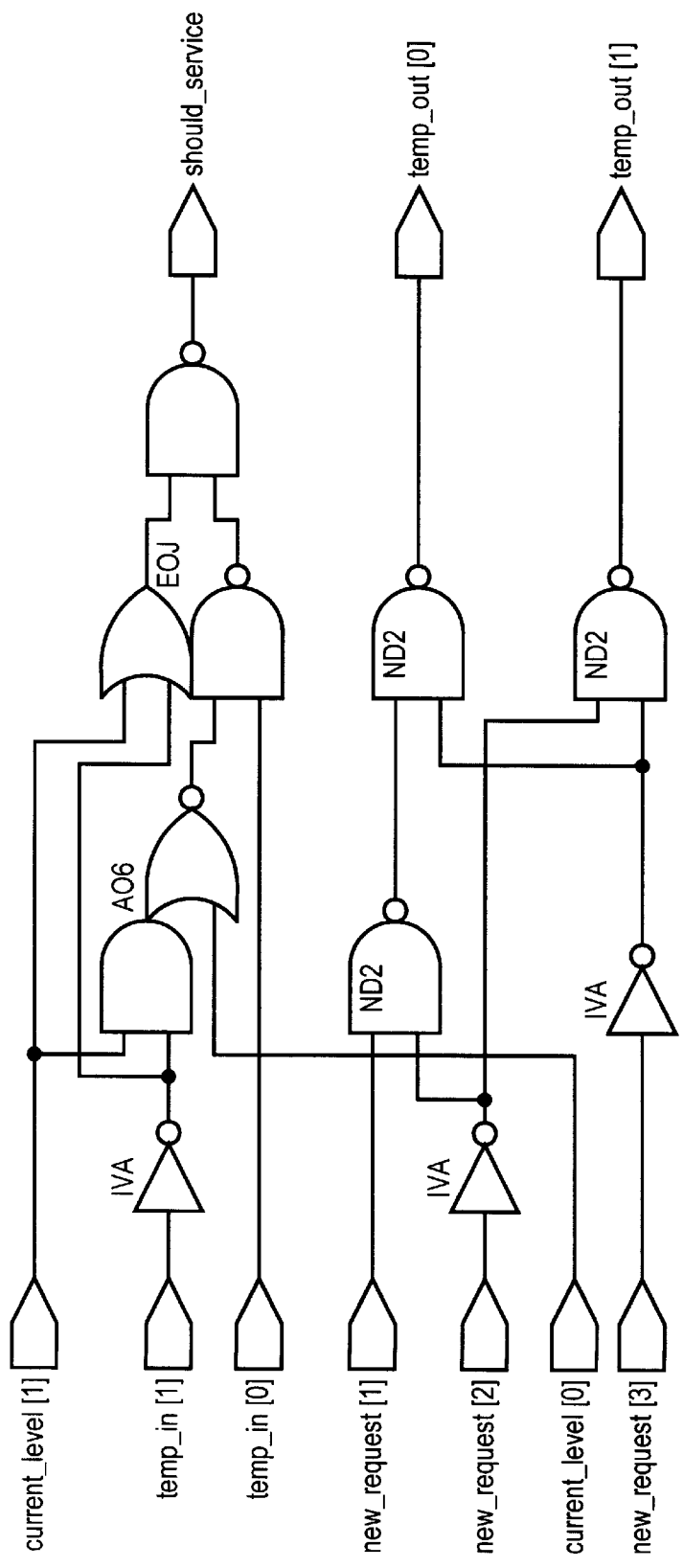
FIG. 18. The circuit obtained by optimizing the circuit of FIG. 17.

The optimizer transforms the circuit of FIG. 17 into the circuit of FIG. 18. This allows the analysis tools to compute timing and area characteristics of both parts of the circuit. A special purpose display tool can then display, for example, timing and area analysis, as shown in FIG. 19. In this example, the decoding circuit is approximately the same size and delay as the comparator circuit.

The block probes used in FIGS. 16 through 20 illustrate a mechanism to select many parts of the HDL source for probing without typing a text statement probe command for each line of HDL. In particular, the block probes in the previous example prohibited the optimizer from eliminating the inputs and outputs of the block. Another kind of block probe that might be useful is one that places a probe on every signal within the block. This will significantly limit the optimizer's ability to improve the circuit within the block, but it will give the designer the maximum amount of information about how the HDL source was translated. A third kind of block probe could place a probe on every statement in the block. A fourth kind of block probe could place a probe on every signal driving multiplexor control inputs within the block. Multiplexors are generated in HDL translation to implement "if" and "case" constructs. Probing the control inputs to these multiplexors would provide a designer with much insight into the circuit behavior.

As described previously, the circuit produced when probes are used can be different from the circuit that occurs when probes are not used. Because probes interfere with the ability of the optimizer to produce higher quality circuits, the designer generally should only use them when the designer needs to gather particular information. During the debugging process, a designer may insert many probe statements into the HDL source at various times to discover the characteristics of different parts of the circuit. One method of managing the number and location of active probes would be to let the designer specify a number with every probe statement that would be the statement's priority. When invoking the optimizer, the designer could then specify a optimization priority. The optimizer would then eliminate every probe with a priority greater than the invoked priority. This would have the effect of permitting the designer to only use the most important probes without having to textually remove the lesser probes.

Alternate Methods for Probing

Figure 20:
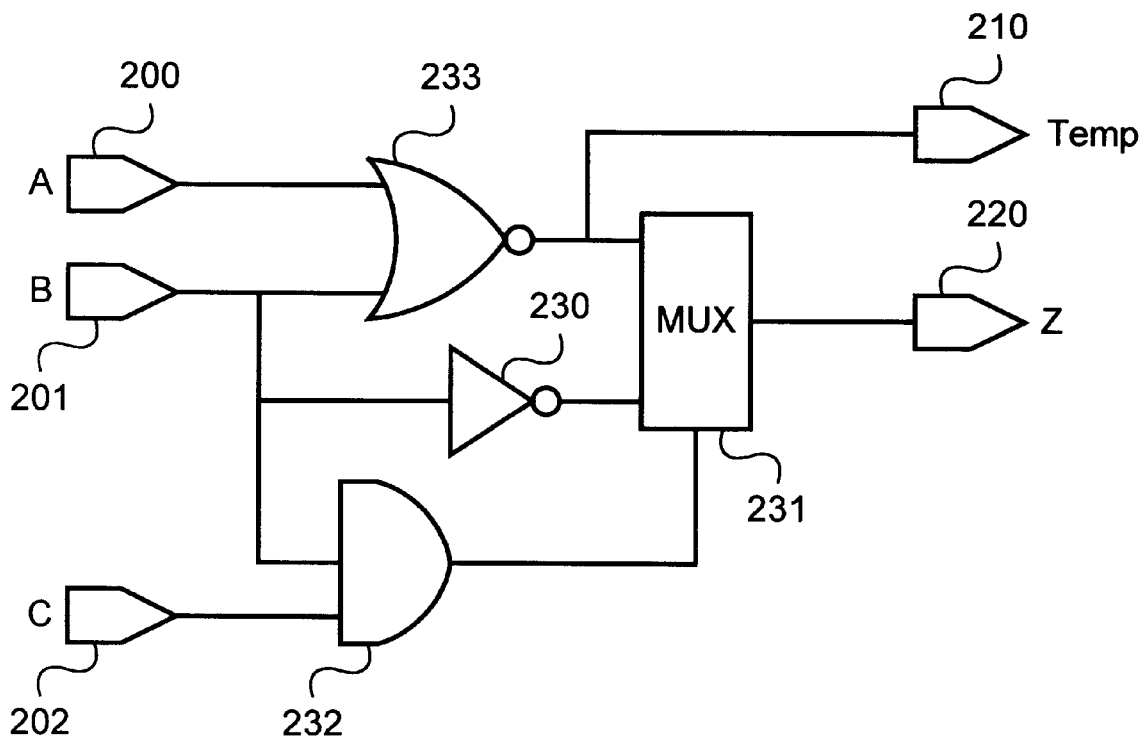
FIG. 20. An alternate method of implementing probes in accordance with the present invention.

FIG. 20 shows an alternate method of having the translator implement probes. The circuit in FIG. 20 would come from the VHDL code fragment of FIG. 11. Instead of creating both a new input and a new output, only a new output 210 is created.

Figure 21:
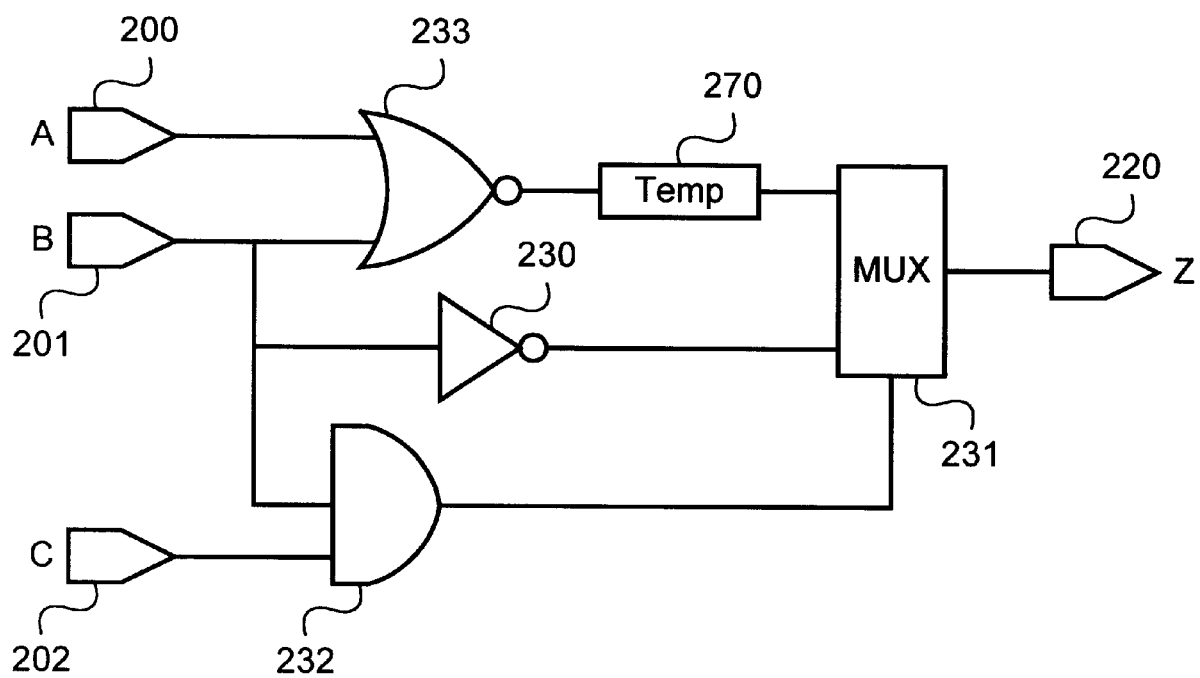
FIG. 21. An second alternate method of implementing probes in accordance with the present invention.

FIG. 21 shows another method of having the translator implement probes. The circuit in FIG. 21 would come from the VHDL code fragment of FIG. 11. Here, a new part 270 is inserted into the design. This part would need to have an additional attribute associated with it to indicate to the optimizer that it was not to be eliminated.

Another method of implementing probes requires attaching an attribute to the net connecting gates together. For example, in processing a probe statement, the translator could create the circuit in FIG. 6, but add information to net 280 that net 280 could not be removed during the optimization process.

Tracing Transitive Fan-In and Fan-Out in the Source HDL

During debugging, the designer may need to consider the impact that a change in one part of the design would have other parts of the design. If the designer is considering changing a particular function in HDL, the designer would find it useful to identify all of the inputs to that function or all of the outputs to that function. The collection of all of the points in a circuit leading to a particular point is referred to as the Transitive Fan-In of that point. The collection of all of the points in a circuit that depend on the value of a particular point is the transitive fan-out. While tracing all of the inputs (or outputs) of a particular part of the source HDL is a difficult task using only the HDL source, using the direct correspondence between the HDL and the initial circuit formed during translation makes it possible to highlight the inputs (or outputs) in the source HDL.

Figure 22:
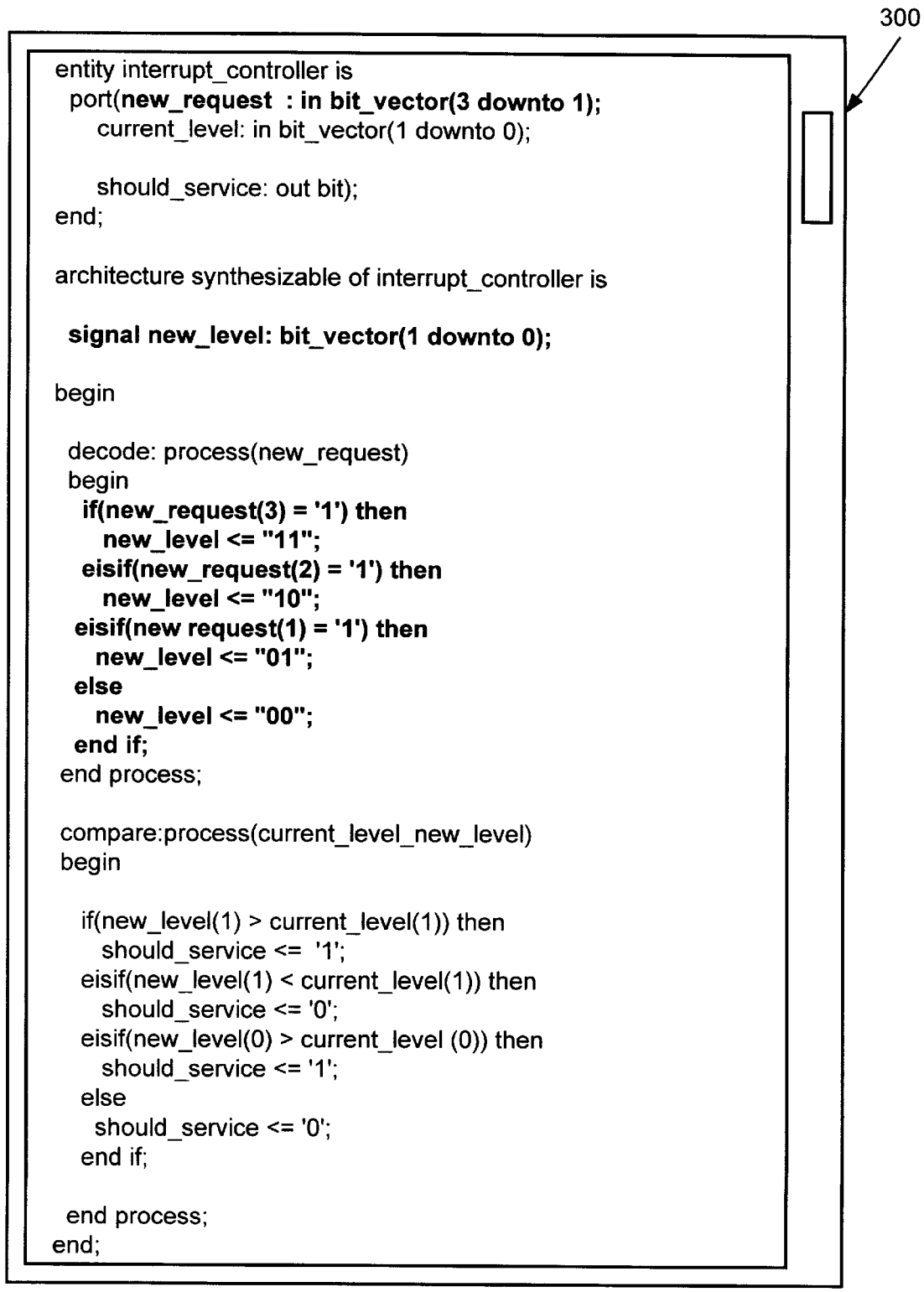
FIG. 22. Display of the transitive fan-in trace of a particular signal in the source HDL in accordance with the present invention.

For example, a designer might be interested in finding all of the computations that feed into the multi-bit signal new_level in the VHDL source of FIG. 12. The designer could select the signal new_level with a mouse and enter a trace command with keystrokes or mouse clicks. A tracing program would trace the desired signal through all computations leading to primary inputs. As the tracing program traces signals back through the initial circuit, it identifies those points corresponding directly to the HDL source, and makes it possible for the text editor to highlight the corresponding HDL source. FIG. 22 provides an example of the text that would be highlighted during such a trace.

Alternatively, the designer might be interested only in the primary inputs or registers that lead to the indicated signal. FIG. 23 shows the result of tracing new_level back to the primary inputs.

System Architecture

Figure 24:
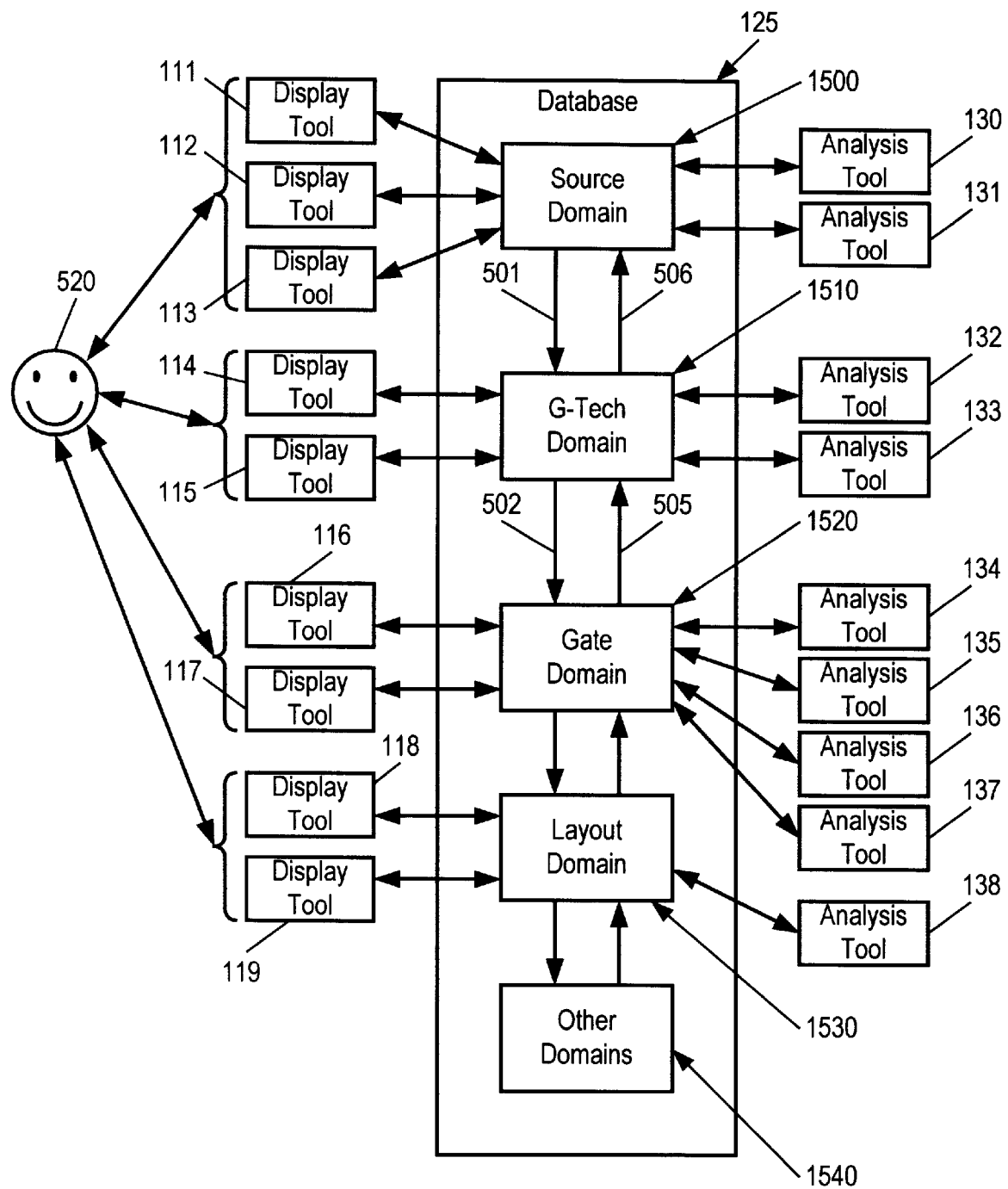
FIG. 24 shows the relationship between the display tools, analysis tools, and the database that maintains the design.

FIG. 24 illustrates the architectural relationship between the display tools 111, 112, 113, 114, 115, 116, 117, 118, and 119 the analysis tools 130, 131, 132, 133, 134, 135, 136, 137, and 138 and the database 125. The designer 520 interacts with the display tools by seeing information on a screen and providing information to the tool by keyboard and mouse. The database 125 contains different representations of the circuit design under development. These representations are grouped into domains 1500, 1510, 1520, 1530, and 1540. The analysis tools 130, 131, 132, 133, 134, 135, 136, and 137 interact with the design information in the various domains to summarize and evaluate the design.

Design Representation: Domains

Providing useful information to the designer about the current state of a circuit design requires an explanation of how different aspects of a designs are stored in a CAD system. Previous sections described the process that a designer goes through to create and debug a design using logic synthesis. In going through the design process, the designer, through the CAD system, manipulated and transformed digital data having some information about the circuit into other digital data that had different information about the circuit. This section explains how the information describing all of the aspects of a design is organized into domains.

A domain is a collection of the design data that contains common structural characteristics. Each domain represents a particular level of abstraction of the design information. In the CAD system architecture of FIG. 24, the design can be divided into a source domain 1500, a generic technology domain 1510, which is also known as a G-Tech domain, a gate domain 1520, a layout domain 1530, and possibly other domains 1540. The design data in one domain can be the result of a transformation of design data from another domain using design tools, such as a logic synthesizer, and libraries of components.

Figure 1:
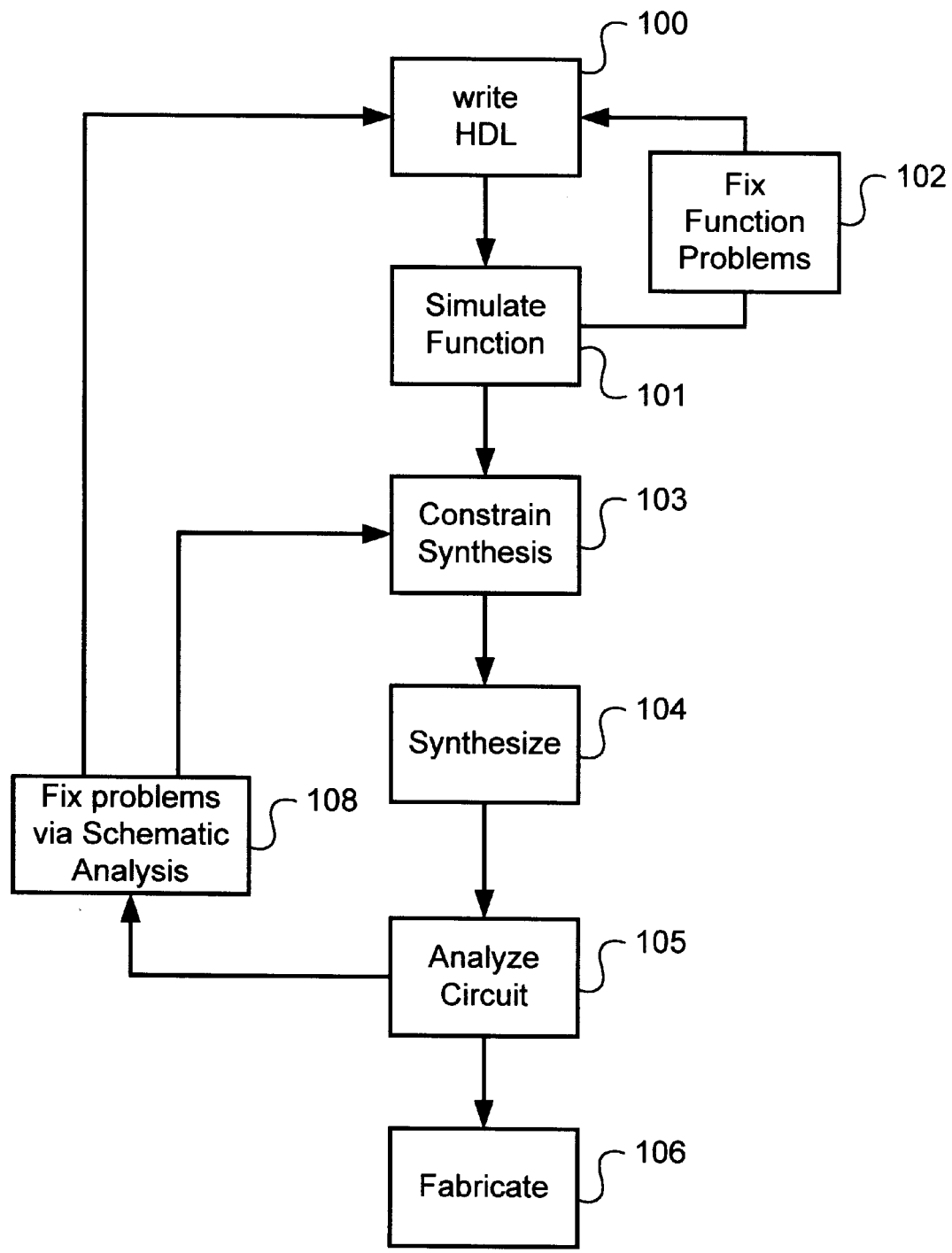
FIG. 1. A flow diagram showing an earlier design process.
Figure 2:
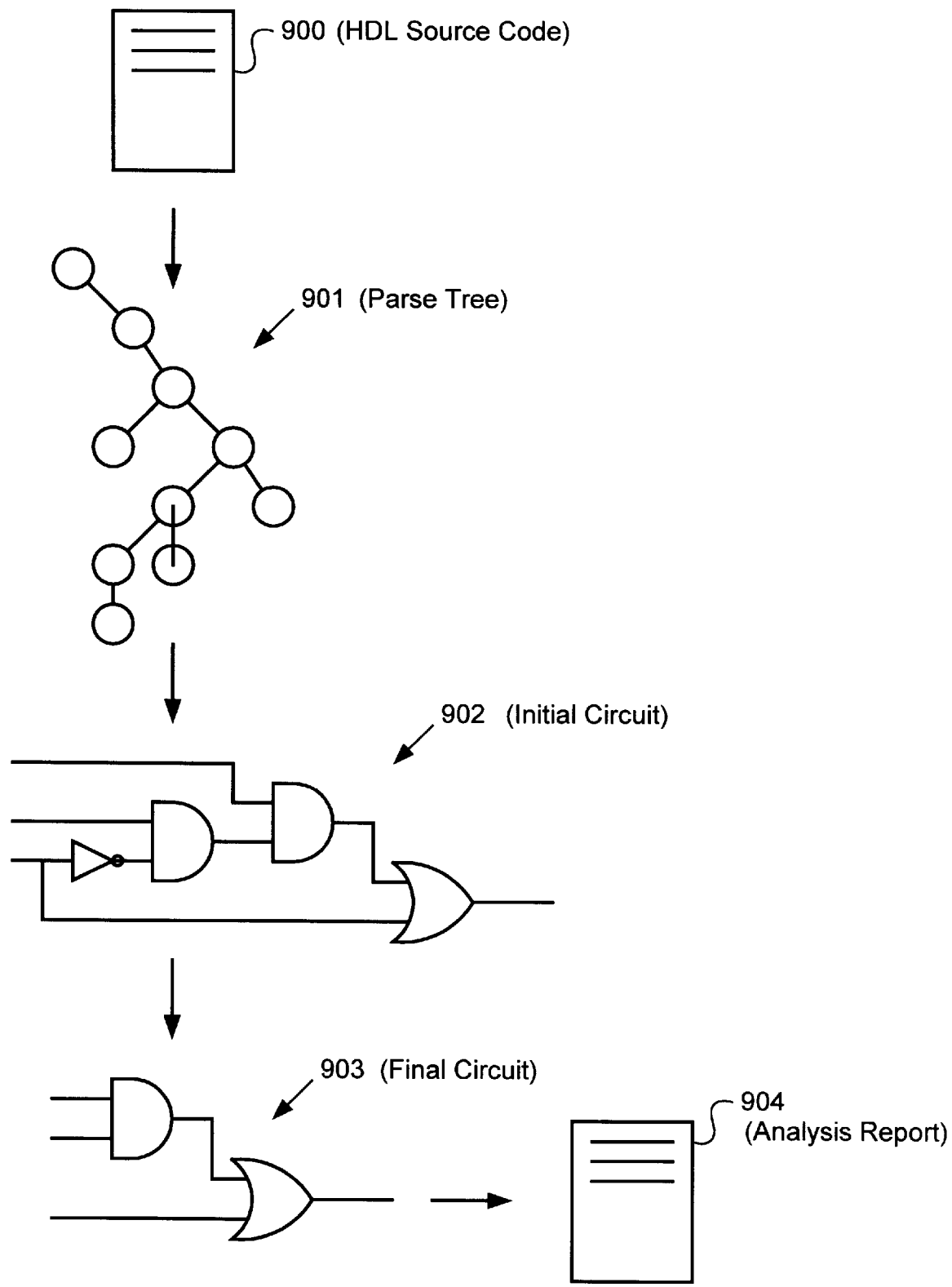
FIG. 2. A flow diagram showing a new design process in accordance with the present invention.

The source domain 1500 contains the HDL source files that the designer creates in step 100 of FIG. 1 or step 150 of FIG. 3. It also contains the parse trees and symbol tables generated during the translation step of logic synthesis. Here, this portion of the design representation only contains information about the desired function of the circuit without reference to circuit topology or technology.

The generic technology domain 1510 contains the initial circuit that arises from the translation step of the synthesis process, as shown in step 104 of FIG. 1 or step 154 of FIG. 3. Data stored in the generic technology domain 1510 contains information about the topology of the circuit, but does not have information about the specific technology to be used.

The gate domain 1520 contains the final circuit that arises after the optimization step of the synthesis process, as shown by link 502. The debugging method previously described establishes the reverse link 505. Like the generic technology domain 1510, the data in the gate domain 1520 contains information about how components are connected together. However, in the gate domain, a particular technology is specified, thus providing information about the physical characteristics of the components used to implement the desired function. It is in this domain that preliminary timing, area, power, testability, and other calculations of step 105 of FIG. 1 and FIG. 3 can be made.

The layout domain 1530 contains information about the geometric placement of the components on the chip substrate and the connections between the components. The design information in the layout domain 1530 is obtained from the design information in the gate domain 1520 by using placement and routing tools.

It would also be possible to have additional domains, as shown by other domains 1540.

Objects within a Domain

Conceptually, the design information within a domain can be thought of as a collection of interconnected objects, with the objects and the connections possessing certain characteristics. For example, in the source domain, the objects could include the text of the HDL source code or the nodes of the parse tree constructed from the source code or the entries in the symbol table. In the gate domain 1520, the objects could include the individual gates or other library parts or the connections between them. In any case, database 125 maintains the relationships between the objects within the domain. The debugging method presented discussed earlier shows how to establish a link between a group of objects in one domain and a group of related objects in another domain.

Display Tools

The information specifying the design is actually represented in binary form within a computer system. For the human designer 520 to develop and debug the design, information about that design must be presented in a form that can be understood by the human, such as by a visual display on a monitor. In addition, the designer 520 must also have a way to manipulate the design information, such as by keyboard and mouse. Display tools 111, 112, 113, 114, 115, 116, 117, 118, and 119 provide a mechanism for that interaction.

However, circuit design information is particularly complicated, and efficiently allowing the designer 520 to control and analyze the design requires that the display tools take advantage of the structure of the design data. One way to take advantage of the structure is to design particular display tools to communicate with a particular domain in the database. For example, as shown in FIG. 24, display tools 111, 112, and 113 communicate with the source domain 1500. Display tools 114 and 115 communicate with the G-Tech domain 1510. Display tools 116 and 117 communicate with the gate domain 1520 while display tools 118 and 119 communicate with the layout domain.

A display tool interacts with its related domain by communicating messages back and forth. These messages involve specifying an object in the domain and some related action to perform on that object. The display tool is customized to interact with a particular domain in the sense that it is constructed to process objects in that domain. In particular, a display tool needs to be able to display an object and have a list available of operations that can be performed on that object, although the display tool does not perform those operations. The database, in contrast, needs to be able to provide the display tool with objects and process requests associated with objects.

Analysis Tools

Analysis tools are used to process information contained within a domain. In general terms, there are two kinds of analysis that one might want to perform in a given domain. The more conventional kind of analysis tool takes one or more objects in a domain, and computes characteristics associated with those objects. For example, in the gate domain, a timing analyzer is used to compute the delay times and slacks to various nodes in the circuit. In the analysis sense, the timing analyzer is determining a certain characteristic, for example, the time that the data signal will become valid after a clock edge, of certain objects in the domain, namely a connection between gates.

Another kind of analysis involves summarizing the characteristics associated with a particular group of objects. For example, estimating the total area in a circuit at the gate level involves summing the area associated with each component and connection.

For an analysis tools to summarize characteristics of objects, the analysis tools requires information about the structure of the objects and the connections between them. Therefore, analysis tools are associated with a particular domain. For example, in FIG. 24, analysis tools 130 and 131 deal with the source domain 1500, while analysis tools 132 and 133 deal with the G-Tech domain 1510. Analysis tools 134, 135, 136, and 137 deal with the gate domain 1520, while analysis tool 138 interacts with the layout domain.

In general terms, analysis tools communicate with the database 125 by messages. The database provides the analysis tool with one or more objects, and the analysis tool responds by setting one or more characteristics of those objects or returning a summary of the characteristics of those objects, or both.

Using the Architecture for Debugging with Reference to the Source Domain

Figure 25:
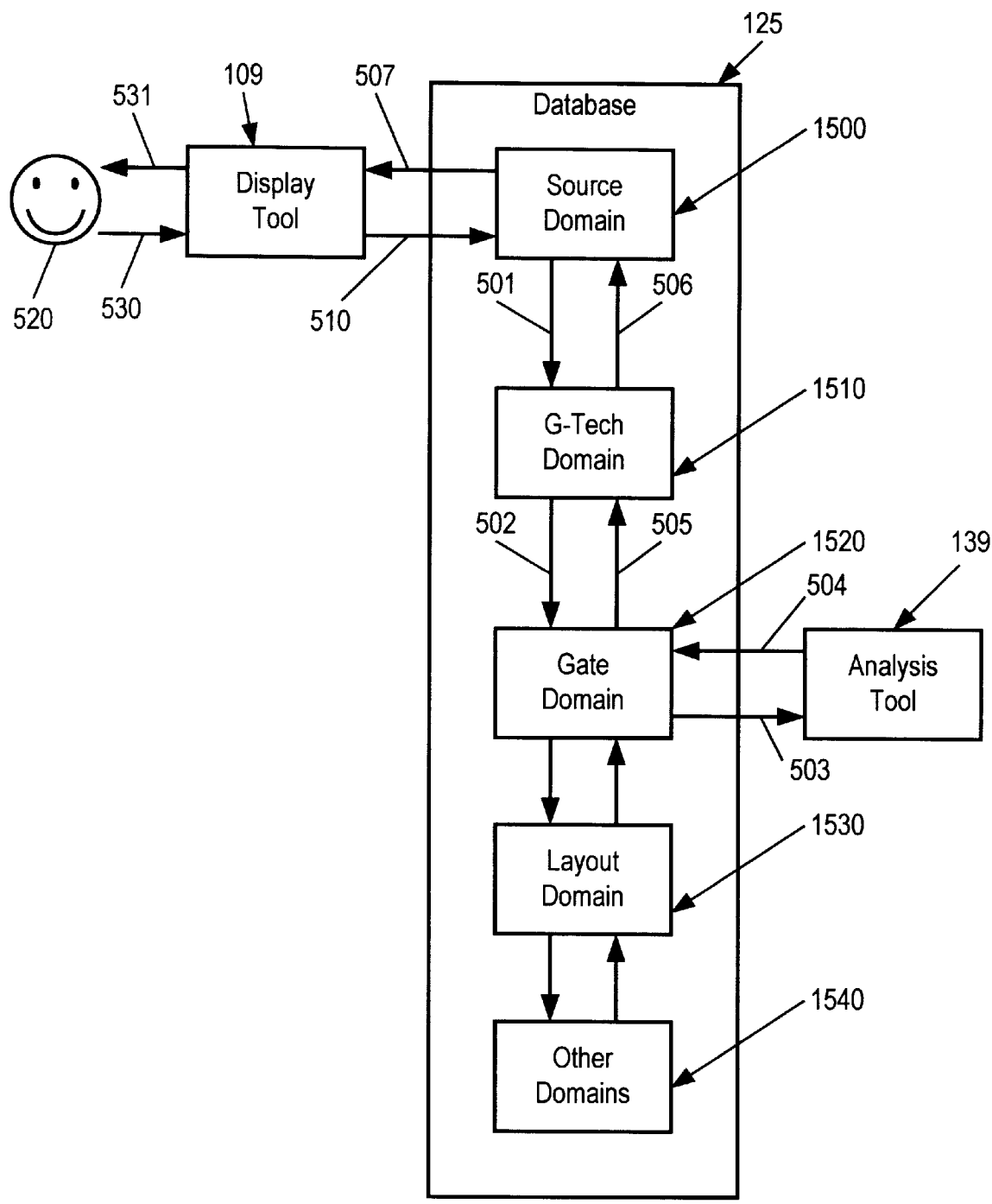
FIG. 25 shows the architecture of FIG. 24 with one display tool and one analysis tool.

This section explains how a designer uses the CAD system architecture to relate characteristics of the design found in one domain to aspects of the design found in another domain. FIG. 25 shows a simplified view of the architecture of FIG. 24 involving only one display tool and one analysis tool. For this example, the design in question is assumed to be complete to the gate domain 1520.

The designer 520 of FIG. 25 begins the pursuit of design insight by first obtaining a display that engages in the debugging process. Next, he obtains a visual representation of an aspect of the design stored, for example, in the source domain 1500 using display tool 109. At the time the display tool 109 begins executing, the database 125 provides the display tool 109 with a list of analysis requests that the designer 520 can request. The display tool 109 could display the text of an HDL source file. The HDL text is an object in the source domain 1500. The processing example described in this section corresponds to the example used in FIG. 12 through FIG. 19.

The designer 520 then selects an object to evaluate by selecting some text, such as the decode: process statement in the text of FIG. 16, and allowing the database 125 to identify the parse tree nodes corresponding to the selected text. Alternatively, to improve performance, the database 125 could transfer data to the display tool to allow the display tool to identify the parse tree node. A good technique for relating particular pieces of text with corresponding parts of a parse tree is described in a co-pending application by Gregory entitled "Method and Apparatus for Context Sensitive Displays", filed on Jun. 3, 1994 with express mail certificate TB596163183US, which is hereby incorporated by reference. The parse nodes are also objects in the source domain.

The designer 520 also selects a type of analysis to be performed from the available choices. One approach is that the designer 520 selects it from a menu or a push button. Another approach would be to have the designer 520 select it before selecting the text. In this example, assume that the designer 520 asks for an estimate of the area of the decode process.

The parse node and the desired analysis form a query that is sent to the database 125. Because area requires technology specific information, the database 125 can identify that the required information is in the gate domain 1520. In essence, the database 125 then needs to compute the area corresponding to the identified parse node. The database does this by identifying the gates in the gate domain 1520 that correspond to that parse node. One way that this can be done is to use the techniques described earlier using hierarchy and probes. In this example, the designer 520 wanted to know what the area of one of the processes is, and the designer 520 used probe points to segregate the design to permit this.

Given that the database 125 has identified the relevant gates, it then needs to compute the total area. In the gate domain 1520, each gate is an object with an associated area characteristic. In this situation, the database could calculate the total area with a summarizing type of analysis tool 139 that sums up the area of each gate in a list. In other situations, it may be necessary to perform a sequence of simpler analysis operations on parts of the data structure to deduce the correct result. The analysis request from the display tool could also include a list of such instructions. Analysis tool 139 then produces a number that is handed back to database 125 which then sends to display tool 109 which can display the result directly or use it to modify the display characteristics.

Display Tools

The flexibility of the architecture shown in FIG. 24 permits additional display tools that relate circuit analysis information about parts of the circuit to the source text that generates those parts. FIG. 26 through FIG. 33 show novel display techniques for displaying circuit analysis data. FIGS. 26 through 33 show the display tools displaying an AMD2910A design. The source and circuit is described in Introduction to HDL-Based Design Using VHDL, by Steve Carlson, published in 1991, which is hereby incorporated by reference. This book is available from Synopsys, Inc., 700 East Middlefield Road, Mountain View, Calif. 94043-4033.

Stacked Bar Graph Display

Figure 26:
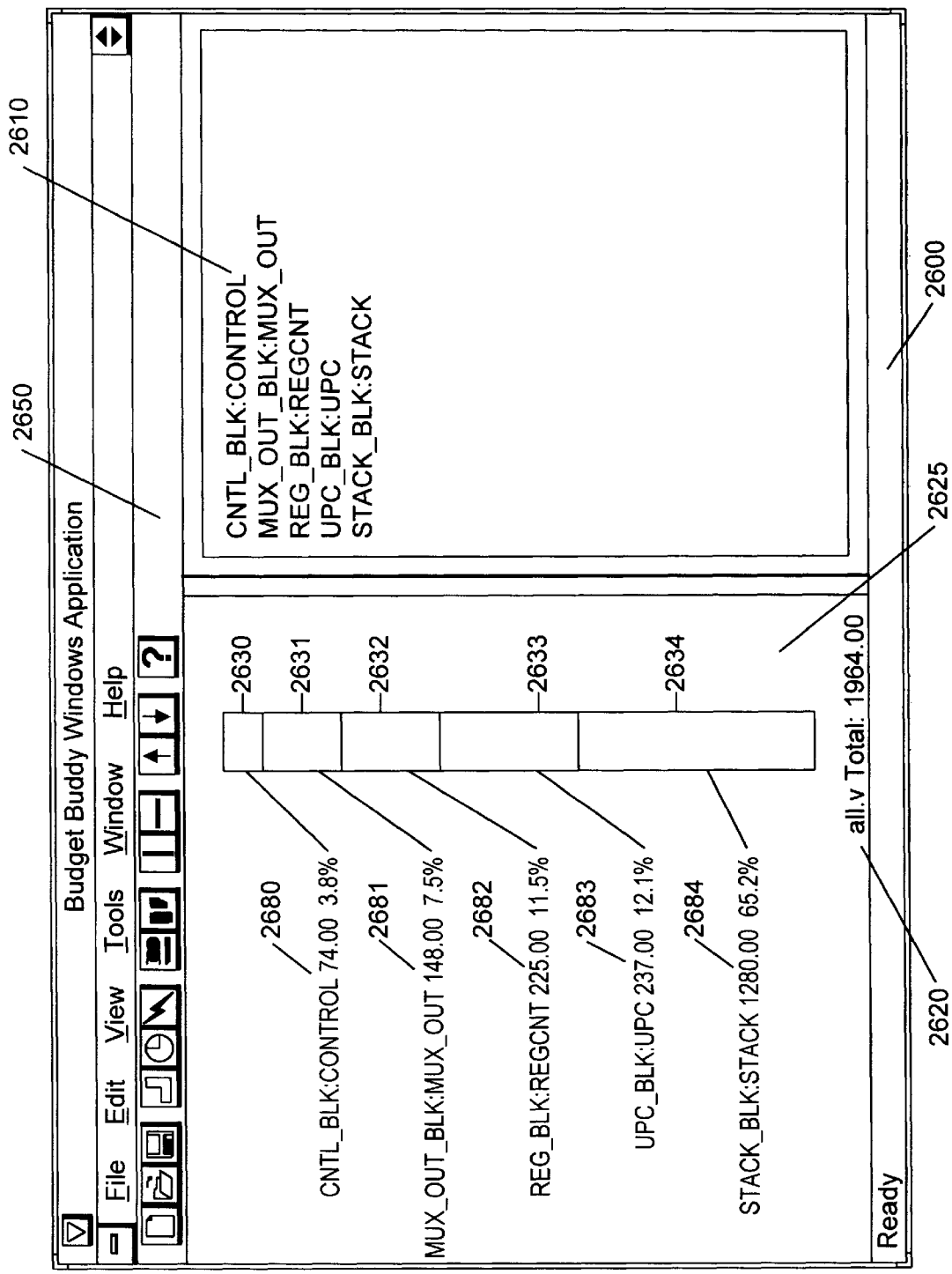
FIG. 26 shows a stacked bar graph display of circuit information.

FIG. 26 shows a stacked bar graph displaying information about the relative contributions of parts of the synthesis source. Often a design written in an HDL is described hierarchically, with higher level modules containing lower level modules. At a particular level in the hierarchy, the designer might want to know the characteristics of the modules visible at that level. The stacked bar graph of FIG. 26 shows relative areas associated with different parts of the design. At the highest level of the AMD 2910A, there are five functional sub-blocks: CNTL_BLK, MUX_OUT_BLK, REG_BLK, UPC_BLK, and STACK_BLK. The names of these blocks are shown in the object list area 2610 of window 2600. The total measured area is displayed at the bottom of the window. The total area of the circuit is shown as 1964.0 gates. In this example, the characteristic is area. However, other characteristics such as power and time can be similarly displayed.

Each of the sub-blocks has a measured characteristic which is shown by text statements 2680 through 2684. For example, CNTL_BLK uses 74.00 gates, which is 3.8% of the total as shown by statement 2680. MUX_OUT_BLK occupies 148.00 gates, which is 7.5% of the total as shown by statement 2681. REG_BLK occupies 225.00 gates, which is 11.5% of the total as shown by statement 2682. UPC_BLK occupies 237.00 gates, which is 12.1% of the total as shown by statement 2683. STACK_BLK occupies 1280.00 gates, which is 65.2% of the total as shown by statement 2684. A stacked bar graph is constructed by drawing a graphical box corresponding to each functional sub-block with the size of the box proportional to the percentage of the sub-block's characteristic to the total characteristic. This is shown with boxes 2630 through 2634.

Importantly, the stacked bar graph display of FIG. 26 can be constructed without reference to the physical nature of the particular characteristic. Therefore, power or timing can be displayed as easily as area. The database need only transfer the names of objects and the numerical value associated with those objects to the display tool.

Figure 27:
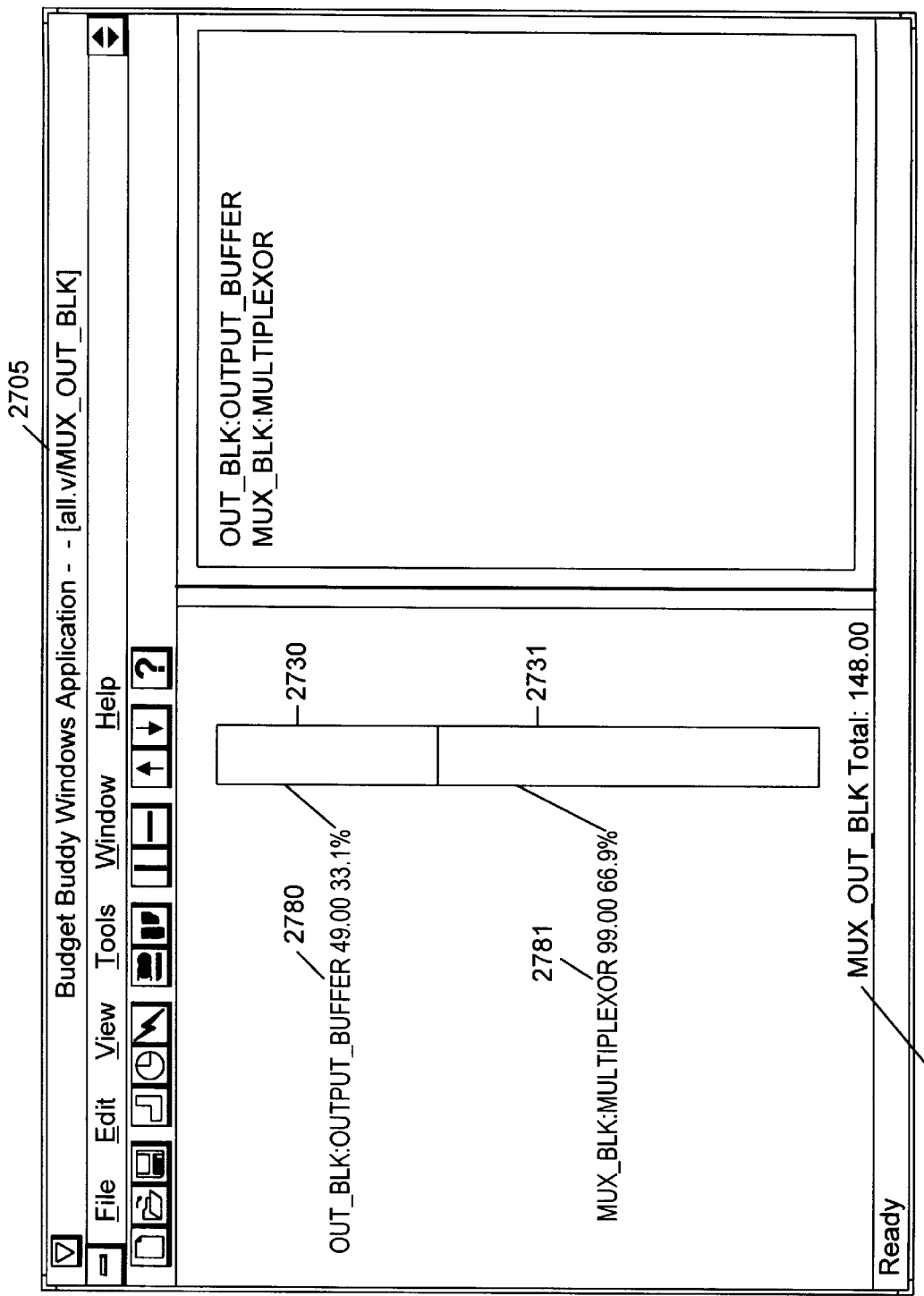
FIG. 27 shows a stacked bar graph display of circuit information showing the relative contribution of one of the sub-blocks in FIG. 26.

Furthermore, each box, such as box 2630 through box 2634, forming part of the stacked bar graph can also be a selectable button. The user can "push" the button and gain information about the sub-block associated with the box. FIG. 27 shows the result of the user selecting the sub-block MUX_OUT_BLK box by selecting box 2631. Here, the sub-block MUX_OUT_BLK itself contains two sub-blocks, OUT_BLK and MUX_BLK. The total measured characteristic 2620 changes to 148.00 to reflect the size of MUX_OUT_BLK. The sub-block OUT_BLK has 49.00 gates representing 33.1% of the area of MUX_OUT_BLK, as indicated by statement 2780. This information is also shown graphically by box 2730. The sub-block MUX_BLK has 99.00 gates representing 66.9% of the area of MUX_OUT_BLK, as indicated by statement 2781. This information is also shown graphically by box 2731. In addition, the window also shows the current location in the hierarchy with a path statement 2705. In addition, statements such as statement 2780 could also act as buttons to change levels.

Figure 28:
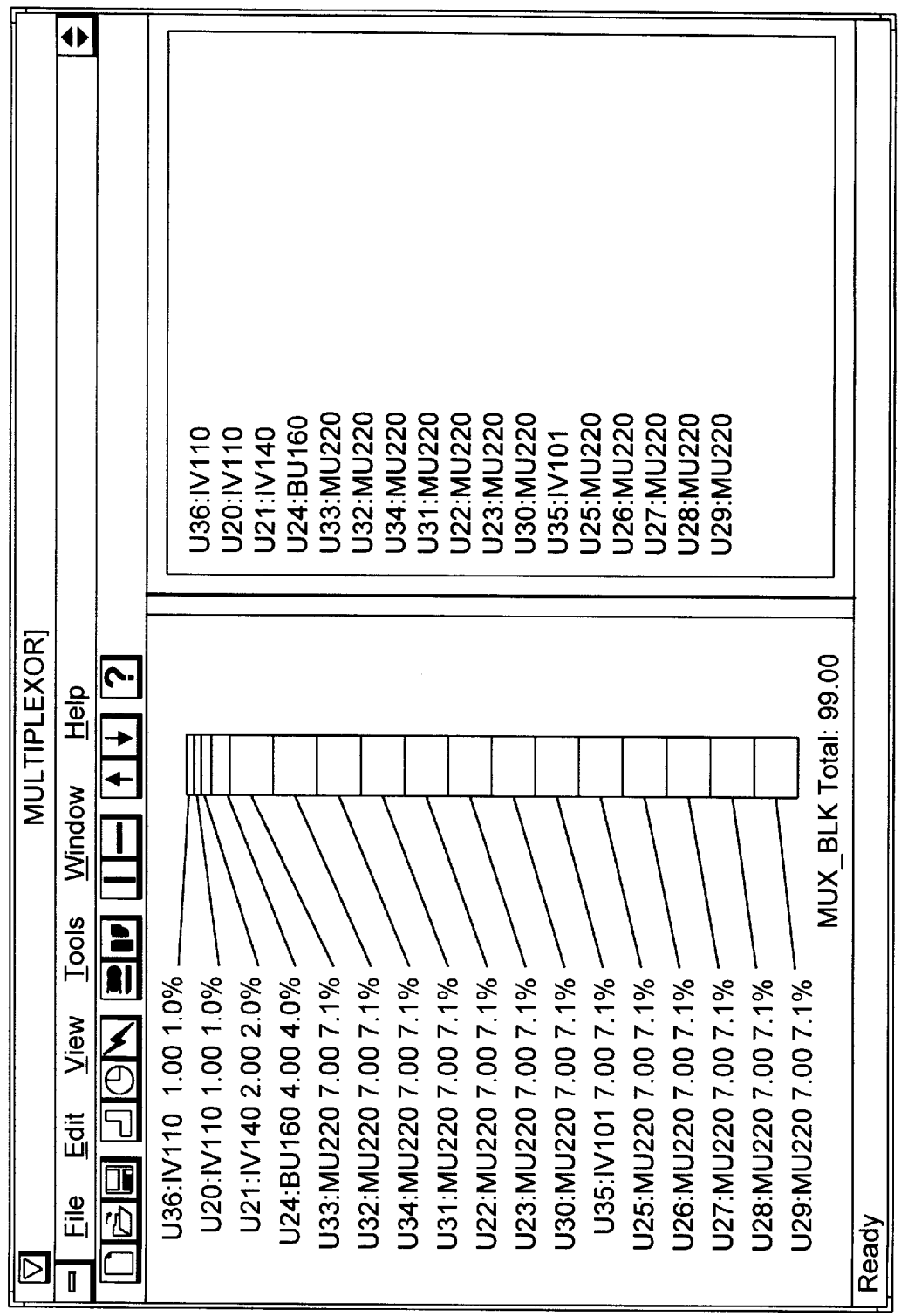
FIG. 28 shows a stacked bar graph display of circuit information showing the relative contribution of one of the sub-blocks in FIG. 27.

FIG. 28 shows the information displayed if the designer selects MUX_BLK to see how the 99.00 gates are allocated.

Histogram Display

Figure 29:
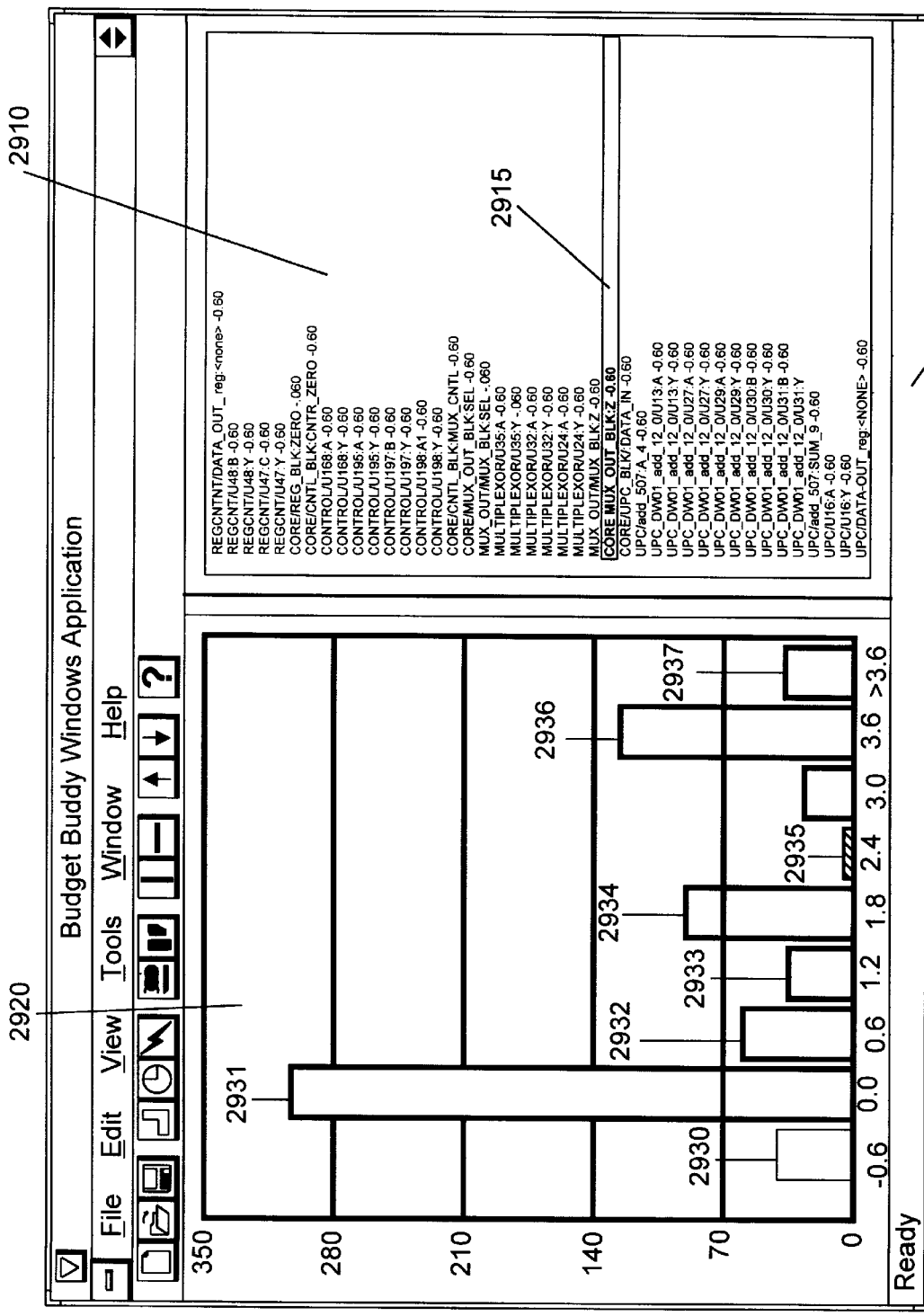
FIG. 29 shows a histogram display of circuit timing information.

The histogram display of FIG. 29 can provide a designer with information about the extent of problems currently in the design. For example, one aspect of the performance of a digital circuit is the delay along any path from the output of one flip-flop to the input of another. Once a designer specifies the clock waveforms, a timing verifier can determine arrival and required times throughout the clocked circuit. At any point in the circuit, the arrival time can be determined relative to a clock edge by measuring the longest path from a register affected by the clock to the point within the circuit. Similarly, required times may be computed relative to a clock edge by measuring the longest path from the point in the circuit to a register affected by the clock. Once the relationships between all clocks and all clock waveforms are specified, the timing verifier can determine the worst slack for each point within the circuit by subtracting arrival from required times for each possible combination of relevant clock edges. The smallest, or most negative result can be considered the worst slack for that point in the circuit. The Design Compiler Reference Manual V3.1a from Synopsys contains more information about timing analysis, and is hereby incorporated by reference. If any node has a negative slack time, then the timing goal has not been met. If only a few nodes are have negative slacks, or the negative slacks are close to zero, then the designer may merely have a relatively small problem that can be fixed by tuning a small portion of the design. However, if many nodes have negative slacks or the slack times are large in magnitude, then the designer may be facing a substantial design problem. The histogram tool of FIG. 29 can provide guidance on the extent of a problem facing a designer.

A histogram tool provides a mechanism for displaying the distribution of a particular numerical characteristic of the circuit and allowing a user to see a list of objects having that characteristic. The example in FIG. 29 displays timing analysis for the AMD 2910. The database uses a timing analyzer and a targeted clock period to compute the slack times on every net. The circuit nodes with similar slack times are grouped into bins, and counted. Histogram-list window 2900 contains two sub-windows: the histogram window 2920 and the list window 2910. The histogram window 2920 contains bars 2930 through 2937 with one bar per bin. The height of the bars indicates the number of nets that fall into that bin. If the user selects one of the bars, the list window 2910 shows the list of names that identify the nets that are in that bin. Individual items in the list display can be selected, as indicated by selected item 2915. This allows the designer to use other display tools to gain more information about the selected item.

Text Display

Figure 30:
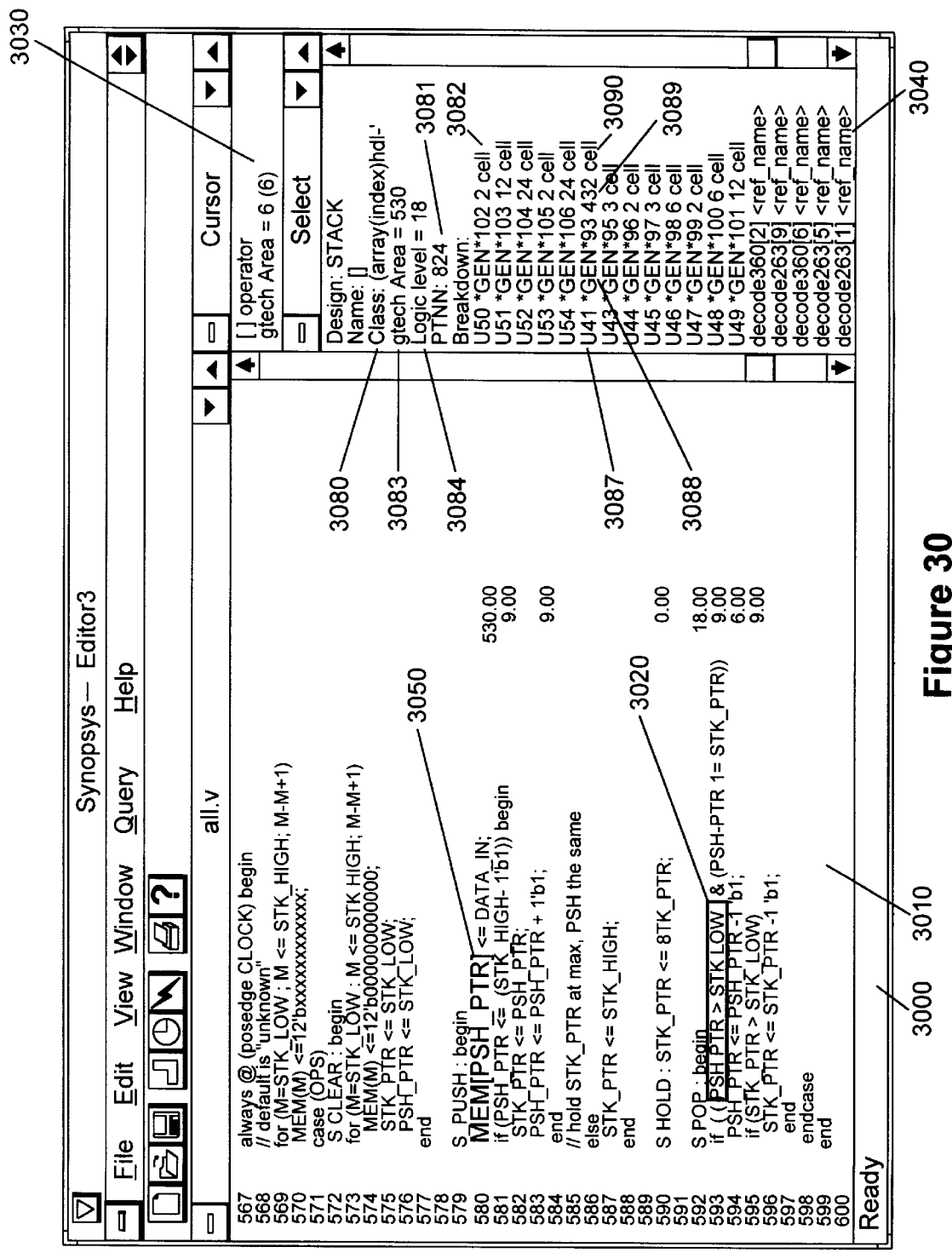
FIG. 30 shows a text display of HDL source code and circuit information related to that source code.

FIG. 30 shows the text display of HDL source code that annotates that source code with additional information. Text display window 3000 contains three smaller windows. Text window 3010 contains the source text. Select window 3040 shows circuit information related to text that has been selected. Cursor window 3030 shows circuit information related to text that is under the cursor. Column report 3060 shows circuit information associated with each line of the text. Selecting text can be done with the usual window based text selection mechanisms. For example, the designer could move a cursor to the relevant portion of the screen and push a button. The text window 3010 constructs a text box 3020 around the object that the cursor is pointing at. One fast method of determining the limits of cursor text box 3020 would be to use the parse tree representation described in co-pending application by Gregory entitled "Method and Apparatus for Context Sensitive Displays", filed on Jun. 3, 1994 with express mail certificate TB596163183US.

Here, cursor window 3030 is showing an estimate of the circuit area associated with the object under the cursor. The phrase "gtech Area=6" indicates that the implementation of the comparison function performed by condition "PSH_PTR>STK_LOW" indicated by cursor text box 3020 requires 6 area units in the generic technology domain in the database. Cursor window 3030 could display other characteristics associated with the text pointed to by the cursor.

Select window 3040 shows information associated with selected text. Here, the size and font of the selected text 1050 is changed. One fast method of determining the limits of selected text 1050 would be to use the parse tree representation described in co-pending application by Gregory entitled "Method and Apparatus for Context Sensitive Displays", filed on Jun. 3, 1994 with express mail certificate TB596163183US. In this example, the select window 3040 shows detailed information about the HDL construct MEM [PSH_PTR] 3050. Statement 3080 shows the type of HDL construct that the selected object is—in this case, the construct is an array index. Statement 3083 shows the estimated area of the construct in the G-Tech domain 1510, here 530 area units. Statement 3084 shows the length of the longest path in levels of logic from a register to the gates that implement the construct, here 18 gates. Statement 3081 shows the parse tree node number. A detailed list 3082 shows the netlist components in the G-Tech domain implementing the construct 3050. For each component in this list, the following information is displayed: the component's netlist instance name 3087, the type of netlist component 3088 (reference name), its contribution to the total area estimate 3089, and the class of netlist component 3090 e.g. cell, pin, net, or port. Other information could be displayed at the designer's option.

Column report 3060 shows information associated with each line. Here, the column report is showing the area associated with the HDL constructs on each line.

Virtual Schematic Display

Figure 31:
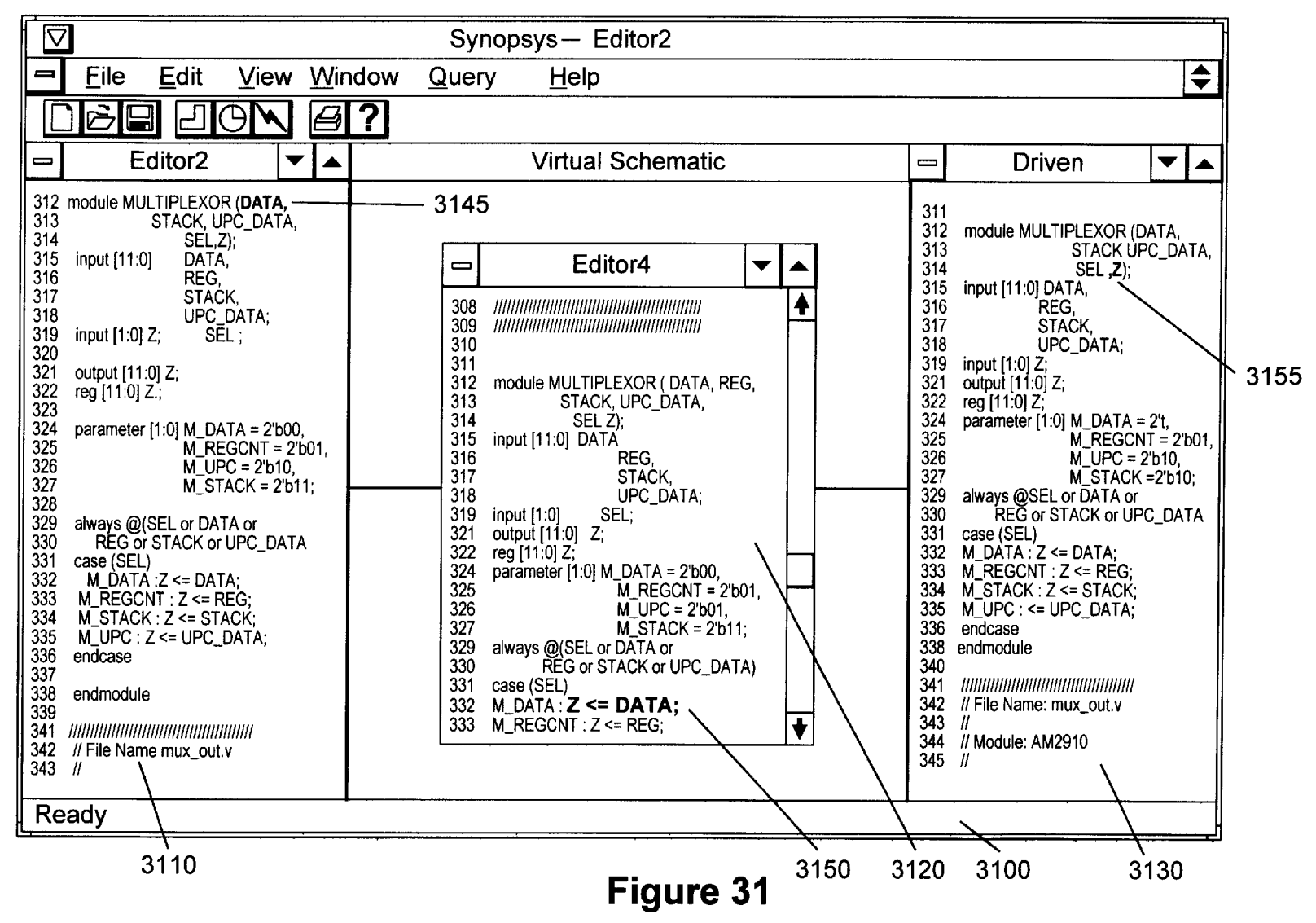

Part of the circuit debugging process involves tracing the drivers and driven or, inputs and outputs of specific circuitry. The virtual schematic display shown in FIG. 31 provides the designer with the ability to find the HDL source that provides inputs to and takes outputs from a particular point in the HDL source. The virtual schematic display has a virtual schematic window 3100 which has three window regions: an input region 3110, a current region 3120, and an output region 3130. The designer uses the cursor to indicate selected text 3150 in the current region. This selected text 3150 corresponds to a circuit object 3151 (not shown) in the database. Circuit object 3151 has inputs and outputs. The database then links the input region 3110 to those portions of the text of the synthesis source that show where the inputs of circuit object 3151 originated. Here, the input "DATA" comes from an input to the module MULTIPLEXOR as indicated by input argument 3145. The database also links the output region 3130 to those portions of the text of the synthesis source that show where the outputs of circuit object 3151 go to. Here, as indicated by output argument 3155, output "Z" goes to the output of module MULTIPLEXOR.

Figure 32:
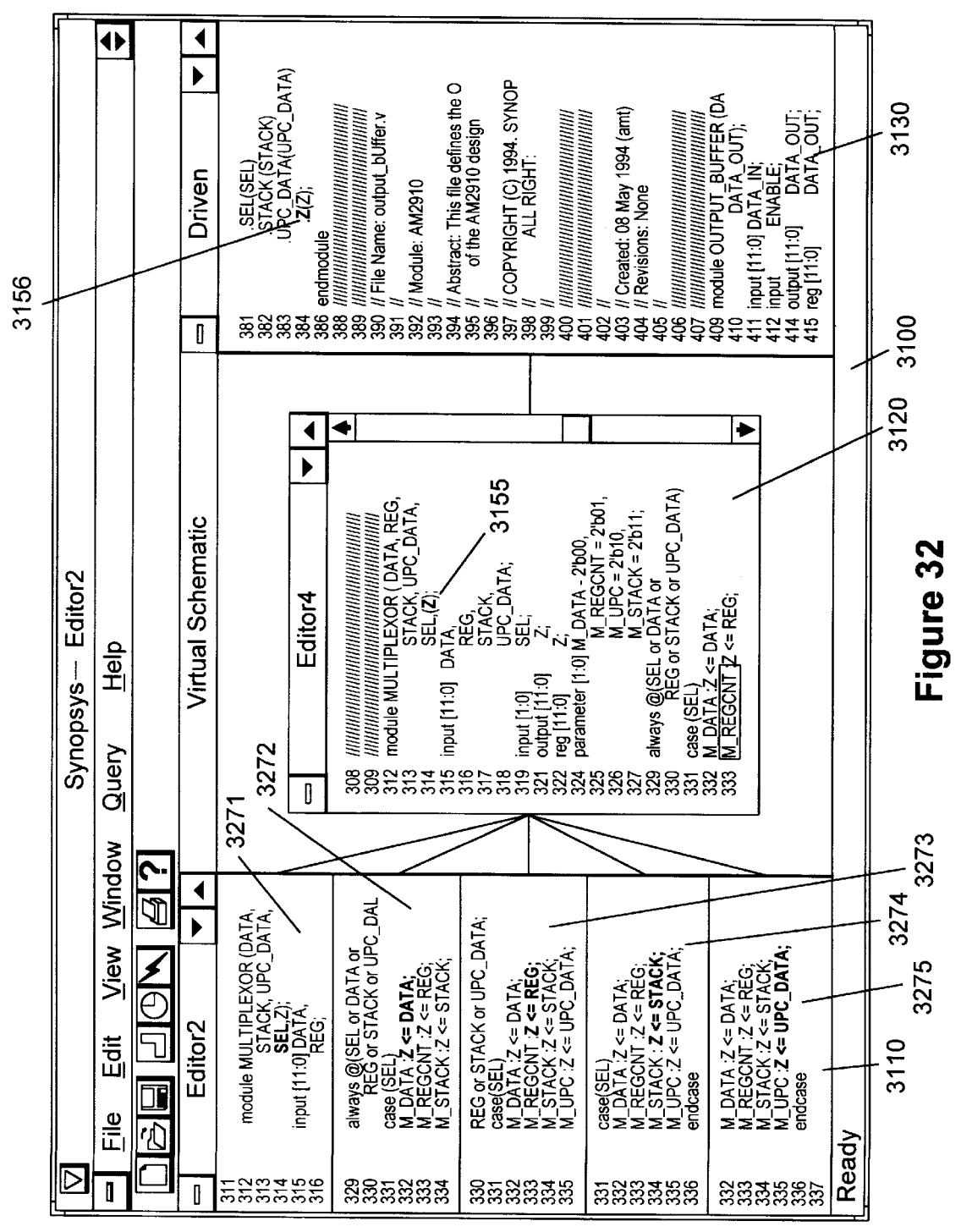

By clicking in the output region, the designer can trace the output further. FIG. 32 shows the changes that occur in the regions. The text of the output region now moves to the current region 3120. The text of the output region changes to show synthesis source text corresponding to objects driven by output argument 3155. Here, output argument 3155 drives another output at the next level module boundary, as shown by output argument 3156. Input region 3110 changes to show all of the places in the source text that set or define the selected output argument 3155. Here, there are five text sources for output argument 3155 as shown in windows 3271, 3272, 3273, 3274, and 3275. The originally selected statement 3150 is shown again in window 3272.

An additional input comes from the MULTIPLEXOR input argument SEL as shown in window 3271. Z is also takes on values at different points in a case statement as shown in windows 3272, 3273, 3274, and 3275.

Figure 33:
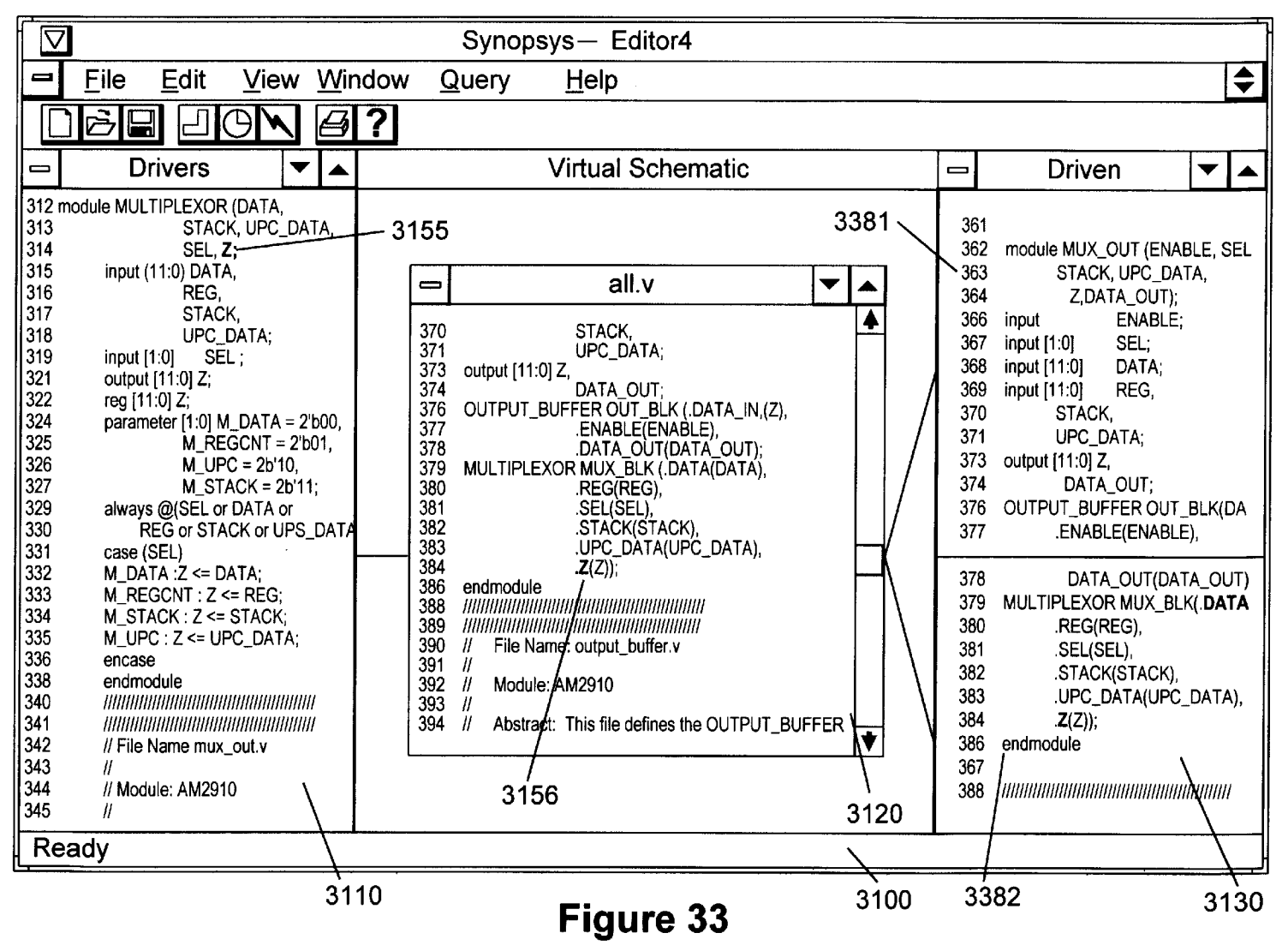

FIG. 33 shows the results of pursuing the output argument 3156. Here, the high level module definition appears in the current region 3120 while the input region 3110 displays the module interface shown in the current region of FIG. 32.

What is claimed is:

1. A method, comprising:

translating a synthesis source text file to an initial circuit including one or more parts connected together with nets;

identifying each part of said initial circuit with the portion of said synthesis source text file that created said part of said initial circuit;

optimize said initial circuit to produce a final circuit containing one or more parts connected together with nets;

analyzing said final circuit to determine characteristics associated with said final circuit's parts and with said final circuit's nets;

identifying said final circuit's part's that correspond directly with said initial circuit's initial parts;

identifying said final circuit's nets that correspond directly with said initial circuit's nets; and displaying said characteristics associated with those said final circuit's nets and parts that correspond directly with said initial circuit's nets and parts near said portions of said synthesis source text file that created said corresponding initial circuit parts and nets.

2. The method of claim 1 wherein said source text file includes directives indicating the location of probes and wherein said translating step include generating initial circuit parts or initial circuit nets that will correspond directly with said final circuit parts or final circuit nets.

* * * * *